United States Patent
Fujii et al.

(10) Patent No.: US 7,918,379 B2
(45) Date of Patent: Apr. 5, 2011

(54) PROCESS FOR WORKING METAL MATERIAL AND STRUCTURES

(75) Inventors: Hidetoshi Fujii, Suita (JP); Masao Fukusumi, Osaka (JP); Yoshiaki Morisada, Osaka (JP); Takeshi Ishikawa, Yokohama (JP)

(73) Assignees: Osaka University, Osaka (JP); Osaka Municipal Technical Research Institute, Osaka (JP); Tokyu Car Corporation, Kanagawa (JP)

( * ) Notice: Subject to any disclaimer, the term of this patent is extended or adjusted under 35 U.S.C. 154(b) by 0 days.

(21) Appl. No.: 12/282,510

(22) PCT Filed: Mar. 7, 2007

(86) PCT No.: PCT/JP2007/054481
§ 371 (c)(1),
(2), (4) Date: Sep. 10, 2008

(87) PCT Pub. No.: WO2007/105573
PCT Pub. Date: Sep. 20, 2007

(65) Prior Publication Data
US 2009/0068492 A1    Mar. 12, 2009

(30) Foreign Application Priority Data
Mar. 10, 2006    (JP) .................................. 2006-066456

(51) Int. Cl.
*B23K 20/12* (2006.01)
*B23K 31/02* (2006.01)
(52) U.S. Cl. ..................................... 228/112.1; 228/230
(58) Field of Classification Search .......................... None
See application file for complete search history.

(56) References Cited

U.S. PATENT DOCUMENTS

| | | | |
|---|---|---|---|
| 6,378,264 B1 * | 4/2002 | Kawasaki et al. | 52/633 |
| 2001/0030222 A1 * | 10/2001 | Konno et al. | 228/112.1 |
| 2003/0042292 A1 * | 3/2003 | Hatten et al. | 228/112.1 |
| 2003/0071107 A1 * | 4/2003 | Colligan | 228/114 |
| 2003/0075584 A1 * | 4/2003 | Sarik et al. | 228/2.1 |
| 2003/0192941 A1 * | 10/2003 | Ishida et al. | 228/112.1 |

(Continued)

FOREIGN PATENT DOCUMENTS

JP    3224092    8/2001
(Continued)

OTHER PUBLICATIONS

English translation of PCT International Preliminary Report on Patentability and Written Opinion of the International Searching Authority, dated Sep. 25, 2008, for International Application No. PCT/JP2007/054481 (6 pages).

(Continued)

*Primary Examiner* — Kiley Stoner
(74) *Attorney, Agent, or Firm* — Osha • Liang LLP

(57) ABSTRACT

In a first step, friction stir welding is performed, while supplying a filler into a joining portion, in order to prevent the coarsening of crystal grains of metal materials in a subsequent fusion processing. Then, a fusion processing such as MIG welding is performed. The filler to be added to the joining portion includes a substance that does not chemically react with the metal materials and has a melting point higher than a melting point of the metal materials and a substance in which a misfit with the metal materials is within ±15%. As a result, the coarsening of crystal grains by the fusion processing is inhibited and the joint strength can be increased.

22 Claims, 33 Drawing Sheets

U.S. PATENT DOCUMENTS

| | | | |
|---|---|---|---|
| 2004/0084506 A1* | 5/2004 | Tanaka et al. | 228/112.1 |
| 2004/0195293 A1* | 10/2004 | Hamada et al. | 228/103 |
| 2005/0011933 A1* | 1/2005 | Grong | 228/165 |
| 2005/0129565 A1* | 6/2005 | Ohriner et al. | 420/431 |
| 2005/0249978 A1* | 11/2005 | Yao | 428/699 |
| 2006/0013645 A1* | 1/2006 | Ilyushenko et al. | 403/270 |
| 2006/0163328 A1* | 7/2006 | Subramanian et al. | 228/112.1 |
| 2006/0249556 A1* | 11/2006 | Subramanian et al. | 228/2.1 |
| 2006/0255094 A1* | 11/2006 | Taylor et al. | 228/101 |
| 2006/0289603 A1* | 12/2006 | Zettler et al. | 228/2.1 |
| 2006/0289604 A1* | 12/2006 | Zettler et al. | 228/2.1 |
| 2007/0044406 A1* | 3/2007 | Van Aken et al. | 52/459 |
| 2007/0102822 A1* | 5/2007 | Kubota et al. | 257/771 |
| 2007/0119276 A1* | 5/2007 | Liu | 75/232 |
| 2007/0119906 A1* | 5/2007 | Mika | 228/112.1 |
| 2008/0041921 A1* | 2/2008 | Creehan et al. | 228/101 |
| 2009/0068492 A1* | 3/2009 | Fujii et al. | 428/615 |
| 2009/0090700 A1* | 4/2009 | Sato et al. | 219/117.1 |

FOREIGN PATENT DOCUMENTS

| | | |
|---|---|---|
| JP | 2002-219584 | 8/2002 |
| JP | 2003-164980 | 6/2003 |
| JP | 2004-298902 | 10/2004 |
| JP | 2005-81427 | 3/2005 |
| JP | 2005-288499 | 10/2005 |
| WO | 2004/043642 | 5/2004 |

OTHER PUBLICATIONS

International Search Report (English only) for PCT/JP2007/054481 mailed Jun. 12, 2007 (2 pages).

esp@cenet patent abstract for JP11197859 dated Jul. 27, 1999 (1 page) (related to Foreign Reference 1 above).

esp@cenet patent abstract for JP2005081427 dated Mar. 31, 2005 (1 page).

esp@cenet patent abstract for JP2004298902 dated Oct. 28, 2004 (1 page).

esp@cenet patent abstract for JP2005288499 dated Oct. 20, 2005 (1 page).

esp@cenet patent abstract for JP2002219584 dated Aug. 6, 2002 (1 page).

esp@cenet patent abstract for JP203164980 dated Jun. 10, 2003 (1 page).

* cited by examiner

PROCESS FOR WORKING METAL MATERIAL AND STRUCTURES

TECHNICAL FIELD

The present invention relates to a method for processing metal materials and a structure formed by the processing method.

BACKGROUND ART

A technique for welding metal materials by friction stir welding (FSW) is known among the conventional methods for processing metal materials. In friction stir welding, metal materials that are to be joined are disposed opposite each other in a joining portion, a probe provided at the distal end of a rotary tool is inserted into the joining portion, and the two metal materials are jointed together, while rotating the rotary tool, along the longitudinal direction of the joining portion. The friction stir welding makes it possible to obtain a good joint strength, but such welding is difficult to apply when the joining portion has a curved surface and when the rotary tool is difficult to insert. For this reason, when a structure such as a rail car body is manufactured by friction stir welding, the metal materials are processed by a combination of friction stir welding and a fusion processing such as MIG welding, rather than by the friction stir welding alone, and a structure having a curved surfaces is manufactured (for example, see the Description of U.S. Pat. No. 3,224,092).
[Patent Document 1] JP Patent No. 3224092.

DISCLOSURE OF THE INVENTION

Problem to be Solved by the Invention

However, further increase in strength is required in the manufacture of rail car bodies from the standpoint of performance improvement, and additional increase in the joint strength is desirable in the aforementioned processing method combining friction stir welding and a fusion processing.

With the foregoing in view, it is an object of the present invention to provide a method for processing metal materials that can improve the joint strength in the case where metal materials are processed by a combination of friction stir welding and a fusion processing and also a structure formed by such processing method.

Means for Solving the Problem

The present invention provides a method for processing metal materials comprising: a first step of disposing two metal materials opposite each other in a joining portion, inserting a rod-shaped rotary tool into the joining portion, rotating the rotary tool, and joining the two metal materials, while supplying into the joining portion a filler that does not chemically react with the metal materials and has a melting point higher than a melting point of the metal materials; and a second step of further performing a fusion processing in the joining portion.

The results of the comprehensive study conducted by the inventors demonstrated that when a fusion processing such as welding is performed in a joining portion of friction stir welding, crystal grains of the joining portion having strains introduced by friction stir welding are recrystallized and coarsened under the effect of heat of the fusion processing and the joint strength decreases. However, with the above-described features, because in the first step, friction stir welding is performed while supplying into the joining portion a filler that does not chemically react with the metal materials and has a melting point higher than a melting point of the metal materials, filler particles can be introduced into the joining portion. As a result, even when the fusion processing is further implemented in the joining portion in the second step, the filler particles remain, without chemically reacting with the metal materials or melting, in the fusion portion of fusion processing and in the surrounding heat affected zone (HAZ) and apply a pressure to the crystal grains that are induced to grow. Therefore, coarsening of crystal grains of the metal materials caused by the fusion processing can be reduced. As a result, the decrease in strength of the joining portion of friction stir welding by the fusion processing can be reduced and the joint strength can be increased.

The first step of the method for processing metal materials in accordance with the present invention includes a case in which the rotary tool is moved, while being rotated, along the longitudinal direction of the joining portion and a case in which the rotary tool rotating in the joining portion is not moved and continuously rotates in the same location. Further, in the present specification, "friction stir welding" includes the following four (1) to (4) modes: (1) friction stir welding in which end portions of plate-shaped metal materials are abutted to form a joining portion and the metal materials are joined by moving, while rotating, a rotary tool along the longitudinal direction of the joining portion; (2) spot friction stir welding (spot FSW) in which end portions of plate-shaped metal materials are abutted to form a joining portion and joining is performed by rotating a rotary tool in the joining portion, without moving the rotary tool; (3) spot friction stir welding in which metal materials are laminated in the joining portion, a rotary tool is inserted into the joining portion through a hole passing through at least one metal material, and the metal materials are joined together by rotating the rotary tool, without movement, in the same location; and (4) friction stir welding in which metal materials are laminated in the joining portion, a rotary tool is inserted into the joining portion through a hole passing through at least one metal material, and the metal materials are joined together by moving, while rotating, the rotary tool along the longitudinal direction of the joining portion, and the combinations of these modes.

The present invention also provides a method for processing metal materials comprising: a first step of disposing two metal materials opposite each other in a joining portion, inserting a rod-shaped rotary tool into the joining portion, rotating the rotary tool, and joining the two metal materials, while supplying into the joining portion a filler in which either an integer multiple or 1/integer multiple of a length (a') of a crystal edge of a unit crystal lattice is within ±15% a length (a) of a crystal edge of a unit crystal lattice of the metal materials; and a second step of further performing a fusion processing in the joining portion.

With such a configuration, in the first step, the friction stir welding is performed while supplying into the joining portion a filler in which either an integer multiple or 1/integer multiple of a length (a') of a crystal edge of a unit crystal lattice is within ±15% a length (a) of a crystal edge of a unit crystal lattice of the metal materials. Therefore, filler particles with a small misfit (Miss Fit) in relation to the crystals of the metal materials of the joining portion can be admixed. Therefore, where a fusion processing is further performed in the joining portion in the second step, when the metal materials solidify again in the fusion portion, the filler particles with a small misfit in relation to the crystals of metal materials become solidification nuclei and a crystal grain is formed for each particle of the filler. As a result, the size of each crystal grain of metal materials that solidify for each particle of the filler becomes small, and although individual small crystal grains can be coarsened, the grains do not aggregate together and do not become large. Therefore, coarsening of crystal grains of the metal materials can be reduced. As a result, the decrease in strength of the joining portion of friction stir welding caused by the fusion processing can be reduced and the joint strength can be increased.

The present invention also relates to a method for processing metal materials comprising: a first step of disposing two metal materials opposite each other in a joining portion, inserting a rod-shaped rotary tool into the joining portion, rotating the rotary tool, and joining the two metal materials, while supplying into the joining portion a filler that does not chemically react with the metal materials and has a melting point higher than a melting point of the metal materials and a filler in which either an integer multiple or 1/integer multiple of a length (a') of a crystal edge of a unit crystal lattice is within ±15% a length (a) of a crystal edge of a unit crystal lattice of the metal materials; and a second step of further performing a fusion processing in the joining portion.

With this configuration, in the first step, because friction stir welding is performed while supplying into the joining portion a filler that does not chemically react with the metal materials and has a melting point higher than a melting point of the metal materials and a filler with a small misfit in relation to the crystals of the metal materials, particles of each filler can be admixed to the metal materials of the joining portion. Therefore, even when the fusion processing is further implemented in the joining portion in the second step, the filler particles that have a melting point higher than a melting point of the metal materials apply a pressure to the crystal grains that are induced to grow by the heat, the particles of the filler with a small misfit in relation to the crystals of metal materials become solidification nuclei, and the size of individual crystal grains of the re-solidifying metal materials is decreased. Therefore coarsening of the crystal grains of metal materials can be reduced. As a result, the decrease in strength of the joining portion of friction stir welding caused by the fusion processing can be reduced and the joint strength can be increased.

Further, the present invention includes both the case in which a filler that does not chemically react with the metal materials and has a melting point higher than a melting point of the metal materials and a filler in which either an integer multiple or 1/integer multiple of a length (a') of a crystal edge of a unit crystal lattice is within ±15% a length (a) of a crystal edge of a unit crystal lattice of the metal materials are supplied into the joining portion and the case in which a filler of one kind that does not chemically react with the metal materials and has a melting point higher than a melting point of the metal materials and in which either an integer multiple or 1/integer multiple of a length (a') of a crystal edge of a unit crystal lattice is within ±15% a length (a) of a crystal edge of a unit crystal lattice of the metal materials is supplied into the joining portion.

In this case, in the first step, the rotary tool can be moved, while being rotated, along a longitudinal direction of the joining portion and the two metal materials can be joined. With such a configuration, because the two metal materials are joined by moving the rotating rotary tool along a longitudinal direction of the joining portion, the two metal materials can be joined even when the joining portion located between the two metal materials is long.

On the other hand, in the first step, the supply of the filler into the joining portion can be performed by placing the filler in the joining portion prior to inserting the rotary tool into the joining portion. With such a configuration, because the filler is placed in advance in the joining portion, the filler can be easily and reliably supplied into the joining portion.

Further, in the first step, the supply of the filler into the joining portion is performed by ejecting the filler to a location of a moving destination of the rotary tool in the joining portion, as the rotary tool moves. With such a configuration, because the filler is ejected to a location of a moving end of the rotary tool, the method can be adapted for a case in which the position of joining portion changes in an actual processing work site and a case in which the direction in which the rotary tool is inserted into the joining portion is different from the vertical downward direction.

In this case, in the first step, the joining portion can be processed into a groove that is opened in a direction facing the rotary tool before the rotary tool is moved in the joining portion. With such a configuration, because the joining portion is processed into a groove that is opened in the direction facing the rotary tool and the filler is ejected into the groove, the filler is temporarily accumulated in the groove and the filler can be even easier supplied into the joining portion.

On the other hand, in the first step, the supply of the filler into the joining portion can be performed by ejecting the filler into the joining portion from inside the rotary tool. With such a configuration, because the filler is ejected into the joining portion from inside the rotary tool, the filler can be reliably supplied into the joining portion and the method can be adapted for a case in which the position of joining portion changes in an actual processing work site and a case in which the direction in which the rotary tool is inserted into the joining portion is different from the vertical downward direction.

Further, in the first step, the supply of the filler into the joining portion can be performed by introducing the filler in advance into a material of the rotary tool and rotating the rotary tool, thereby supplying the filler into the joining portion as the rotary tool wears down. With such a configuration, because the filler is supplied into the joining portion, as the rotary tool containing the filler wears down, the filler can be evenly supplied into the joining portion and dispersivity of the filler can be her increased.

On the other hand, according to another aspect of the present invention, there is provided a structure formed by processing two or more metal materials by the method for processing metal materials in accordance with the present invention. With such a configuration, because the method for processing in accordance with the present invention forms metal materials by a combination of friction stir welding and a fusion processing, the decrease in the joint strength of friction stir welding zone caused by the fusion processing is small and a structure with a higher strength can be obtained.

Effect of the Invention

With the method for processing metal materials in accordance with the present invention, the decrease in strength of the joining portion of friction stir welding caused by a fusion processing can be reduced and the joint strength can be increased. Further, in the structure in accordance with the present invention, the decrease in the joint strength of friction stir welding zone caused by the fusion processing is small, and a structure with a higher strength can be obtained.

Figure 1:
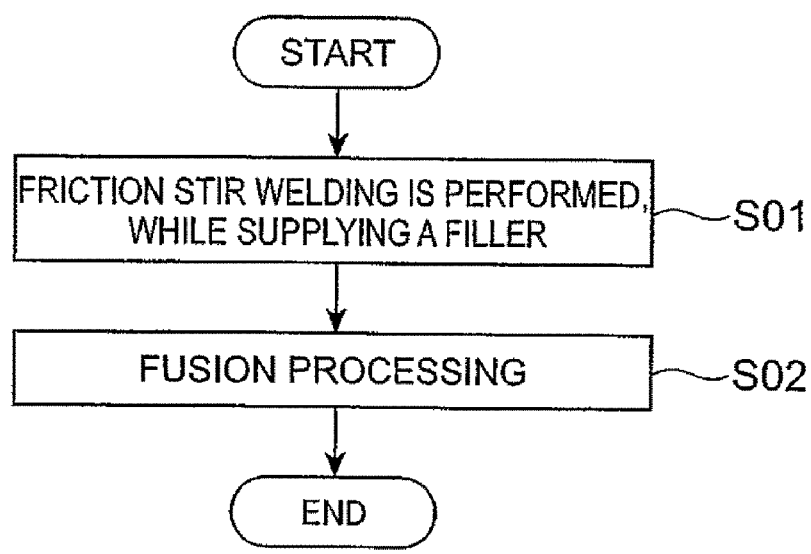
FIG. 1 is a flow chart illustrating the processing flow of a method for processing metal materials of a first embodiment of the present invention.

EXPLANATION OF REFERENCE NUMERALS 10 rotary tool
12 probe
14 shoulder
16 rotary tool body
18 filler
20 filler ejection nozzle
22 filler ejection port
24 filler supply channel
100, 102 metal material
104 joining portion
106 groove
108 SiC particle
110 base material
112 stirring portion
114 crystal grain boundary
116 insertion hole
118 joined portion
200 car structure body
202, 204 roof structure
206, 208 side structure
210 platform
212 end frame
214, 216 eaves member
218 friction stir welding portion
220 fusion joining portion
222 multiple processing portion

BEST MODE FOR CARRYING OUT THE INVENTION

An embodiment of the present invention will be described below with reference to the appended drawings. Like structural elements are denoted by like reference numerals and redundant explanation thereof is omitted.

First, a main processing flow of the method for processing metal materials of the present embodiment will be explained. FIG. 1 is a flowchart illustrating the processing flow of the method for processing metal materials of the first embodiment of the present invention. As shown in FIG. 1, in the present embodiment, in a first step, friction stir welding is performed, while supplying a filler to a joining portion, in order to prevent the coarsening of crystal grains of the metal materials in the course of subsequent fusion processing (S01). A typical structure that has curved zones or zones into which a rotary tool is difficult to insert is difficult to form by the friction stir welding alone. Therefore, a fusion processing such as MIG welding is thereafter performed (S02).

Figure 2:
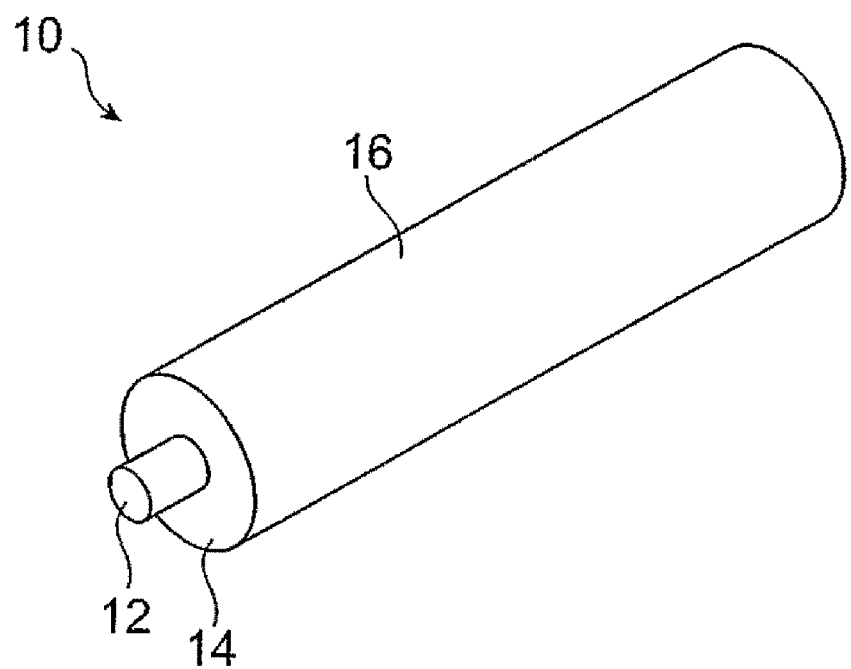
FIG. 2 is a perspective drawing of a rotary tool of the first embodiment of the present invention.

Each step of the processing method of the present embodiment will be described below in greater detail. FIG. 2 is a perspective view illustrating a rotary tool of the first embodiment of the present invention. As shown in FIG. 2, a rotary tool 10 has a rotary tool body 16 in the form of an almost cylindrical column. The rotary tool 10 has a shoulder 14 and a probe 12 to be inserted into a joining portion of metal materials at the distal end of the rotary tool body 16. The probe 12 has an almost cylindrical columnar shape with a diameter smaller than that of the shoulder 14. In the present embodiment, the material of the rotary tool 10 can be a tool steel such as SKD61 conforming to JIS, a superhard alloy composed of tungsten carbide (WC) and cobalt (Co), or a ceramic such as $Si_3N_4$.

Figure 3:
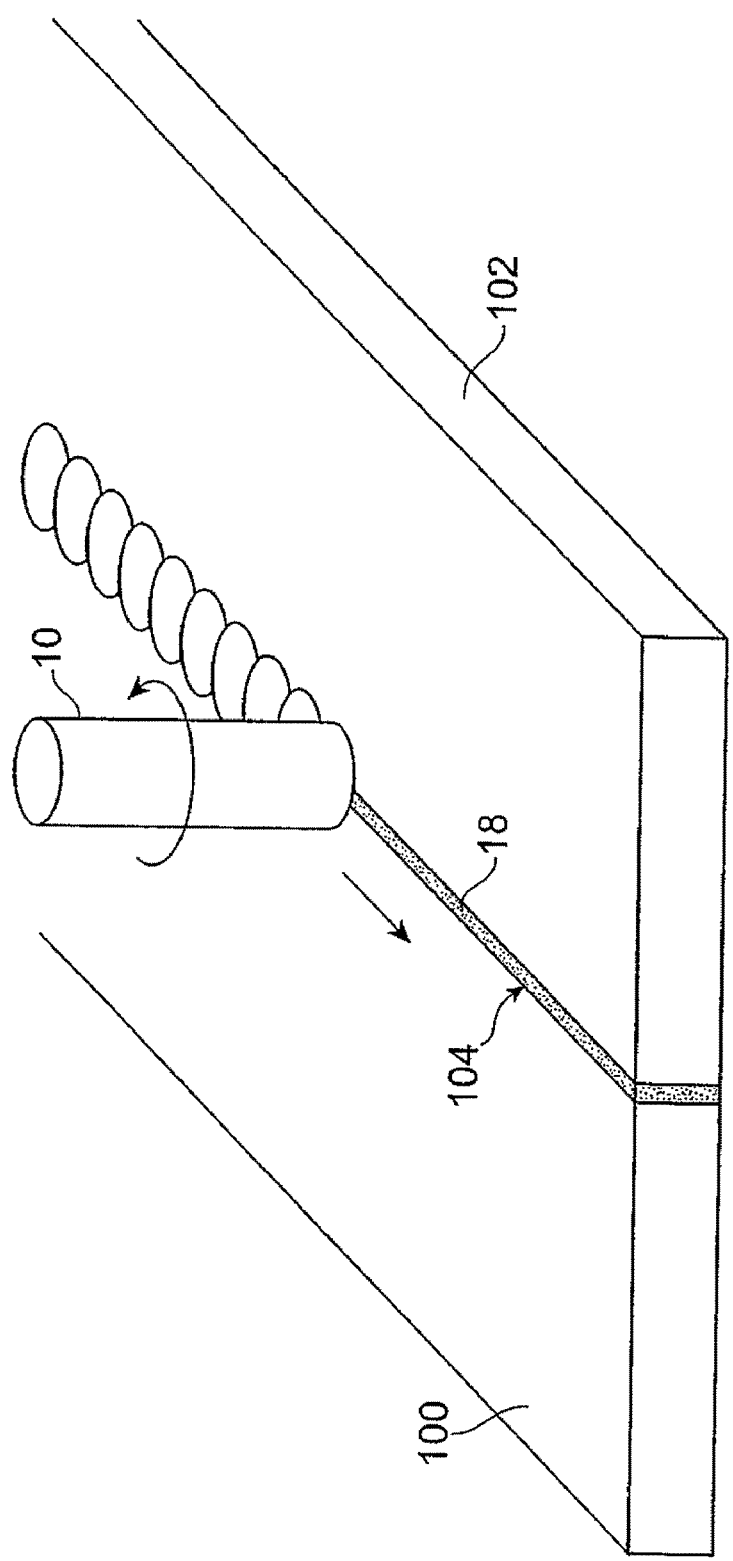
FIG. 3 is a perspective view illustrating a mode of friction stir welding of the first embodiment of the present invention.

FIG. 3 is a perspective view illustrating a mode of friction stir welding in the first embodiment of the present invention. As shown in FIG. 3, in the friction stir welding of the present embodiment, two metal materials 100, 102 are abutted against each other in a joining portion 104. For example, an Al material, a Fe material, or a Mg material can be employed as the metal materials 100, 102. Alternatively, an ultrafine-grain material that is obtained by subjecting these metal materials to a structure control such as accumulative roll-bonding (ARB) and has an average crystal grain size of the metal material reduced to 10 μm or less can be also employed.

In the friction stir welding of the present embodiment, before the rotary tool 10 is inserted, a filler 18 is charged into the joining portion 104; the filler contains a substance that does not chemically react with the metal materials 100, 102 and has a melting point higher than the melting point of the metal materials 100, 102 and a substance in which either an integer multiple or 1/integer multiple of a length (a') of a crystal edge of a unit crystal lattice is within ±15% a length (a) of a crystal edge of a unit crystal lattice of metal materials 100, 102.

The substance that does not chemically react with the metal materials 100, 102 and has a melting point higher than the melting point of the metal materials 100, 102 remains, without melting, in a subsequently performed fusion processing and serves to prevent the crystal grains of the metal materials 100, 102 from coarsening. When the metal materials 100, 102 are an Al material, a Fe material, a Mg material, and these materials processed to have ultrafine grains, metals with a high melting point such as Ti and W and carbides, nitrides, or oxides such as SiC, TiC, $Si_3N_4$, BN, AlN, $Al_2O_3$, $ZrO_2$, and MgO can be employed as the substance that does not react with the metal materials and has a melting point higher than that of the metal materials. In particular, SiC can be effectively used. These substances are processed to an average grain size of 0.5 μm to 5 μm so that they can be easily dispersed in the joining portion 104 during friction stir welding.

The substance in which either an integer multiple or 1/integer multiple of a length (a') of a crystal edge of a unit crystal lattice is within ±15% a length (a) of a crystal edge of a unit crystal lattice of metal materials 100, 102, that is, the substance with a misfit within ±15%, becomes solidification nuclei when metal materials solidify again after the subsequently performed fusion processing and serves to decrease the size of crystal grains of the metal materials. When the metal materials 100, 102 are an Al material, examples of substances that can be used as the substance with a misfit within ±15% include VC (misfit 1.4%), TiC (misfit 6.8%), $TiB_2$ (misfit 4.8%), $AlB_2$ (misfit 3.8%), ZrC (misfit 14.5%), NbC (misfit 8.6%), and $W_2C$ (misfit 3.5%). When the metal materials 100, 102 are a Fe material, examples of substances that can be used as the substance with a misfit within ±15% include TiN (misfit 3.8%), TiC (misfit 5.8%), SiC (misfit 6.0%), ZrN (misfit 11.2%), WC (misfit 12.6%), and ZrC (misfit 14.4%). When the metal materials 100, 102 are a Mg material, Zr particles can be used as solidification nuclei by adding Zr particles to a Mg material containing no Al among the alloy components. Where a Mg material contains Al among the alloy components, C particles can be added to obtain $Al_4C_3$ that is a reaction product as solidification nuclei. These substances are processed to an average grain size of 0.5 μm to 5 μm so that they can be easily dispersed in the joining portion 104 during friction stir welding.

Different substances can be employed as the substance that does not chemically react with the metal materials 100, 102 and has a melting point higher than the melting point of the metal materials 100, 102 and the substance that has a misfit with the metal materials 100, 102 within ±15% and the filler 18 can be obtained by mixing these substances. Alternatively, the filler 18 may be obtained by employing a substance of one kind that does not chemically react with the metal materials 100, 102, has a melting point higher than the melting point of the metal materials 100, 102, and also has a misfit within ±15%.

After the filler 18 has been charged into the joining portion 104, the rotary tool 10 is inserted into the joining portion 104. The rotary tool is moved, while being rotated, along the longitudinal direction of the joining portion 104, and the metal materials 100, 102 are joined together. The particles of the filler 18 charged into the joining portion 104 are stirred by the rotary tool 10 and mixed with the metal materials 100, 102. The metal materials 100, 102 can be also joined together by a spot friction stir welding in which the rotary tool 10 is rotated in the joining portion 104, without being moved in this zone.

Figure 4:
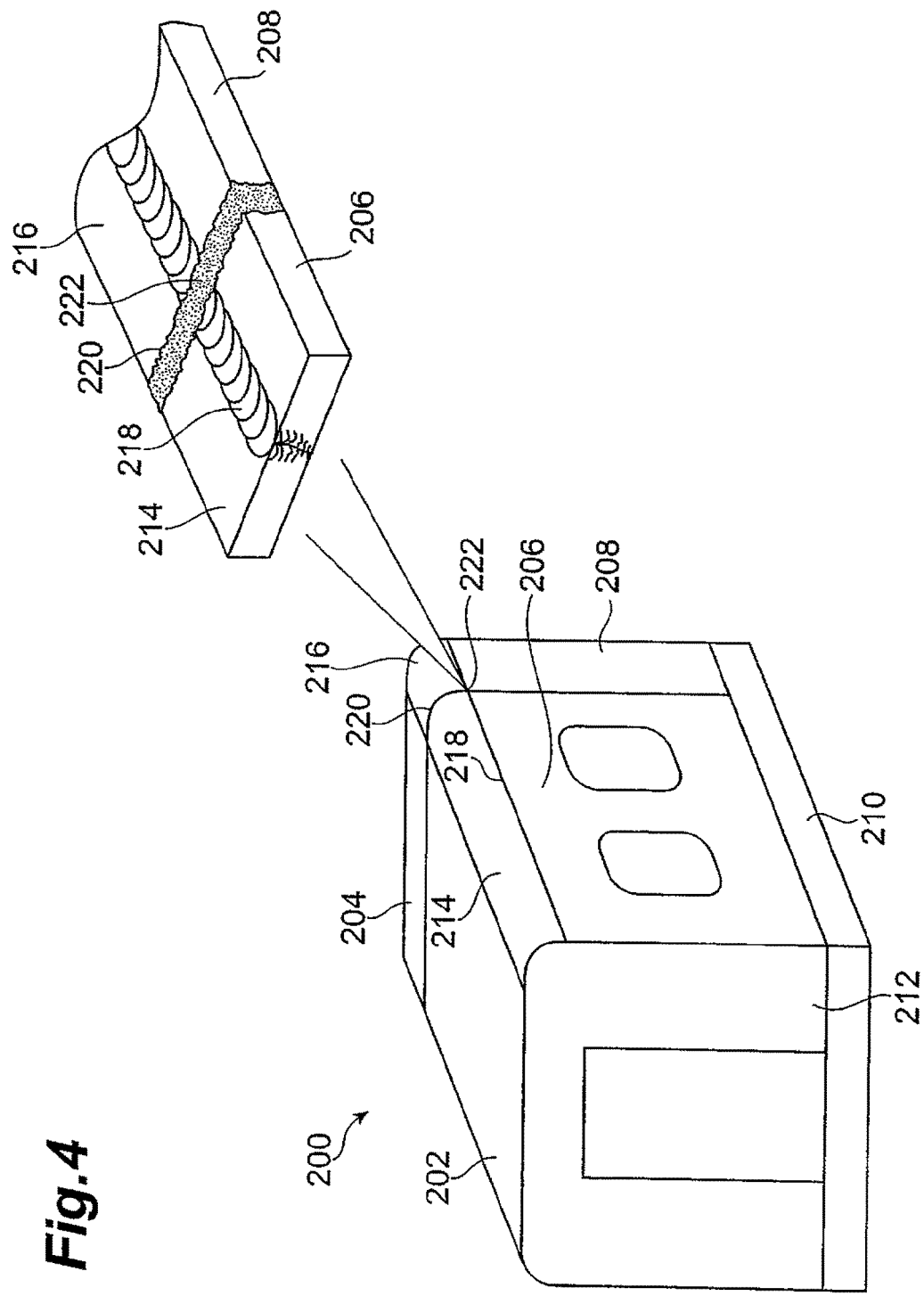
FIG. 4 is a perspective drawing illustrating a rail car structure formed by the method for processing metal materials of the first embodiment of the present invention.

FIG. 4 is a perspective view illustrating a rail car structure formed by the method for processing metal materials of the first embodiment of the present invention. As shown in FIG. 4, a rail car structure 200 is composed of roof structures 202, 204, side structures 206, 208, a platform 210, an end frame 212, and eaves members 214, 216. In the example shown in FIG. 4, in the friction stir welding portion 218, joining by friction stir welding is performed between the side structure 206 and eaves member 214 and between the side structure 208 and the eaves member 216. Then, in the fusion joining portion 220, the side structures 206, 208 containing curved portions in parts thereof are joined together by fusion joining and the eaves members 214, 216 are joined together by fusion joining. In the intersection of the friction stir welding portion 218 and fusion joining portion 220, after friction stir welding of the metal materials has been performed, fusion joining is carried out to form a multiple processing portion 222. In the present embodiment, in addition to a zone where the friction stir welding portion 218 and fusion joining portion 220 shown in FIG. 4 partially intersect, a fusion processing can be also performed from above the friction stir welding portion 218 on top thereof to ensure complete overlapping of the friction stir welding portion 218 and fusion joining portion 220. Further, in addition to a process in which the fusion joining is carried out immediately after the friction stir welding has been performed, the fusion processing can be also implemented in the friction stir welding portion 218 when local cavities or groove defects of the friction stir welding portion 218 are repaired or when zones of the friction stir welding portion 218 that have degraded with the passage of time are repaired. Gas welding or plasma welding can be employed as the fusion processing. Alternatively, arc welding such as submerged welding, MIG welding, TIG welding, $CO_2$ welding, and shielded arc welding, or spot welding can be employed.

The operation effect of the method for processing metal materials of the present embodiment will be described below. The research conducted by the inventors demonstrated that when a fusion processing such as welding is performed on the joining portion obtained by friction stir welding, crystal grains in the joining portion that have strains induced by friction stir welding are recrystallized and coarsened by heat of the fusion processing and the joint strength decreases. Accordingly, in the present embodiment, the particles of the filler 18 substance that does not chemically react with the metal materials 100, 102 and has a melting point higher than the melting point of the metal materials 100, 102 are admixed into the joining portion 104. The particles of the filler 18 do not chemically react with the metal materials 100, 102, even when the joining portion 104 is thereafter subjected to the fusion processing, and remain without melting by heat of the fusion processing. Further, because the particles of the filler 18 immobilize the crystal grains of the metal materials 100, 102 that can be coarsened by heat of the fusion processing, coarsening of the crystal grains of metal materials 100, 102 can be reduced. This effect is especially significant in a heat-affected zone around the fusion portion produced by the fusion processing. As a result, the decrease in strength of the joining portion 104 of friction stir welding caused by a subsequent fusion processing can be reduced and the joint strength can be increased.

In the case where an ultrafine-grain material is employed for the metal materials 100, 102, when friction stir welding is performed by admixing the filler 18 that does not chemically react with the ultrafine-grain material and has a melting point higher than the melting point of the ultrafine-grain material into the joining portion 104, the joint strength immediately after friction stir welding can be greatly increased.

On the other hand, in the present embodiment, particles of the filler 18 in which either an integer multiple or 1/integer multiple of a length (a') of a crystal edge of a unit crystal lattice (misfit) is within ±15% a length (a) of a crystal edge of a unit crystal lattice of metal materials 100, 102 are admixed into the joining portion 104. Where the joining portion 104 is thereafter subjected to a fusion processing, when the metal materials 100, 102 solidify again in the fusion portion produced by the fusion processing, particles of the filler 18 with a small misfit in relation to the crystals of the metal materials 100, 102 become solidification nuclei and a crystal grain is produced for each particle of the filler 18. As a result, the size of each crystal grain of metal materials 100, 102 that solidify for each particle of the filler 18 becomes small, and although individual small crystal grains are coarsened, they do not aggregate together and do not become large. Therefore, coarsening of crystal grains of the metal materials 100, 102 can be reduced. As a result, the decrease in strength of the joining portion 104 of friction stir welding caused by a subsequent fusion processing can be reduced and the joint strength can be increased.

In particular, in the present embodiment, because the filler 18 is charged into the joining portion 104 before the rotary tool 10 is inserted into the joining portion 104, the filler 18 can be easily and reliably supplied into the joining portion 104.

Figure 5:
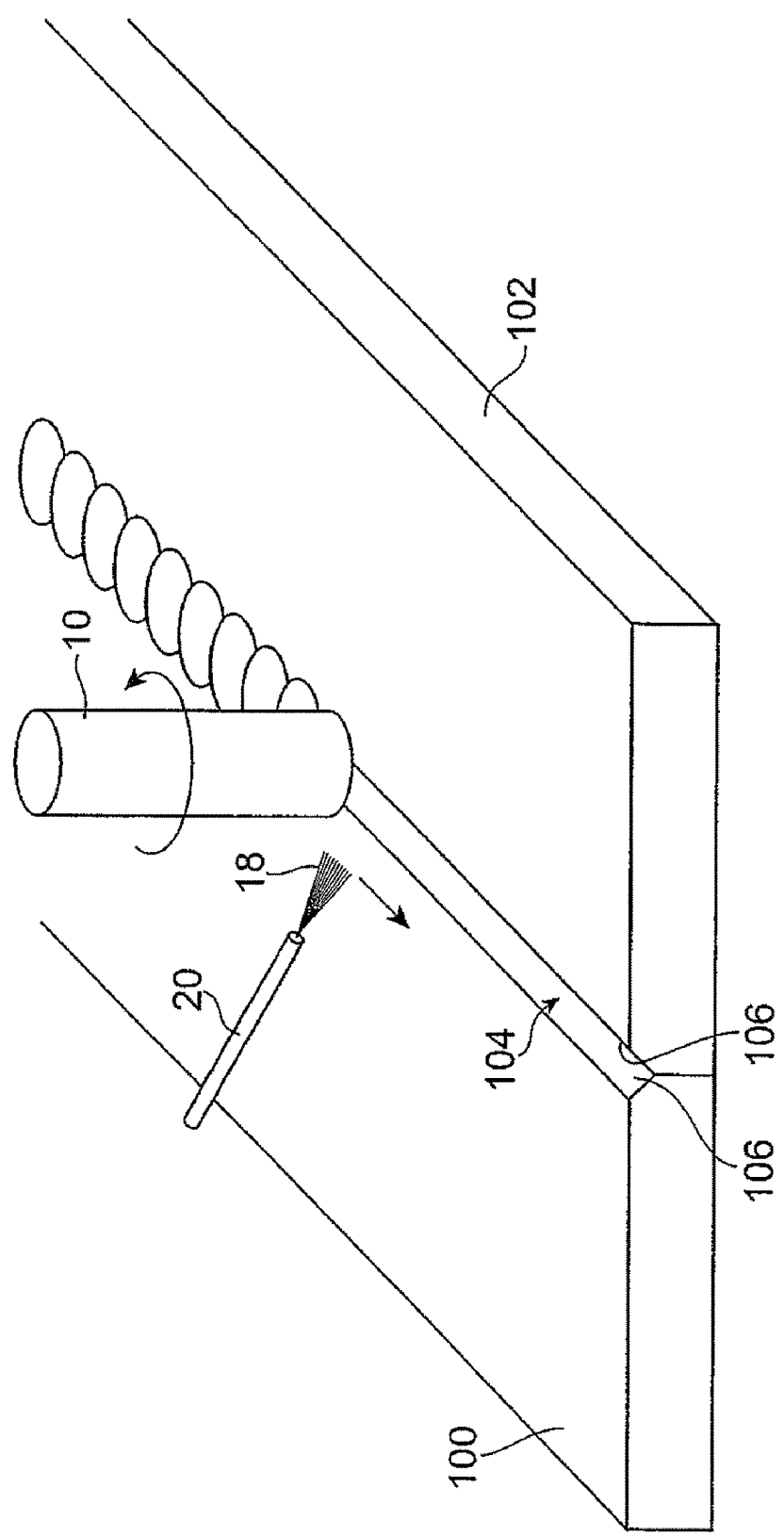
FIG. 5 is a perspective view illustrating a mode of friction stir welding of a second embodiment of the present invention.

A second embodiment of the present invention will be described below. FIG. 5 is a perspective view illustrating a mode of friction stir welding of the second embodiment of the present invention. As shown in FIG. 5, the present embodiment differs from the above-described first embodiment in that the filler 18 is supplied into the joining portion 104 by ejecting the filler 18 from a filler ejection nozzle 20 to the location of the moving end of the rotary tool 10. In the present embodiment, the filler ejection nozzle 20 is provided so as to move correspondingly to the movement of the rotary tool 10, thereby enabling the ejection of the filler 18 to the location of the moving end of the rotary tool 10. Further, in the present embodiment, the joining portion 104 may be processed to have a groove 106 opened in the direction facing the rotary tool 10 before the rotary tool 10 is moved.

In the present embodiment, because the filler 18 is ejected to the zone in which the rotary tool 10 moves, the configuration can be adapted for a case in which the position of the joining portion 104 changes in the actual processing work site or a case in which the direction in which the rotary tool is inserted into the joining portion 104 is different from the vertical downward direction. Further, because the filler 18 temporarily stays in the groove 106, the filler 18 can be even easier supplied into the joining portion 104.

Figure 6:
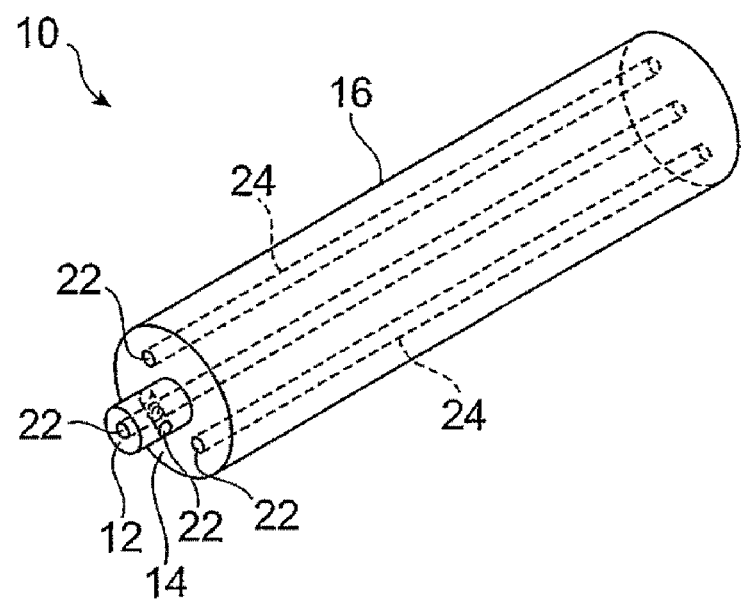
FIG. 6 is a perspective drawing of a rotary tool of the third embodiment of the present invention.
Figure 7:
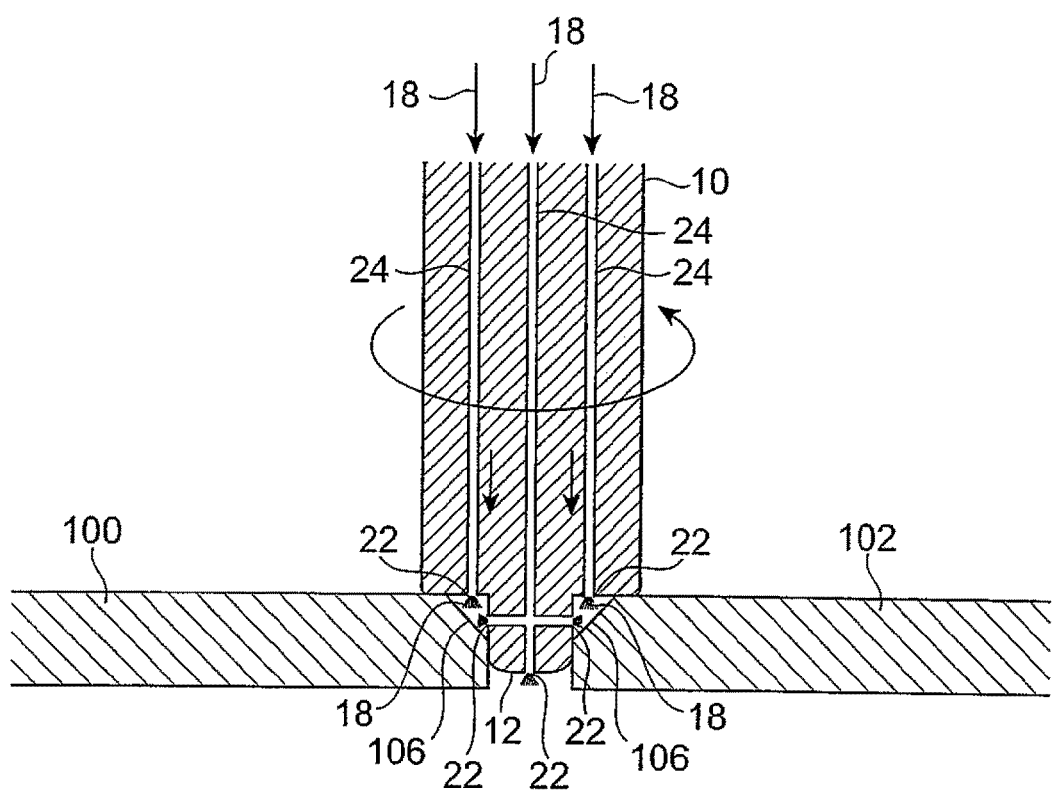
FIG. 7 is a perspective view illustrating a mode of friction stir welding of a third embodiment of the present invention.

A third embodiment of the present invention will be described below. FIG. 6 is a perspective view of the rotary tool of the third embodiment of the present invention. FIG. 7 is a cross-sectional view illustrating a mode of friction stir welding of the third embodiment of the present invention. The present embodiment differs from the above-described first embodiment in that the filler 18 is ejected from inside the rotary tool 10 into the joining portion 104 as the rotary tool 10 moves. As shown in FIG. 6, in the rotary tool 10 of the present embodiment, filler ejection holes are provided in the distal end and on the side surfaces of the probe 12 and at the distal end of the shoulder 14, and filler supply channels 24 that pass to the filler ejection holes 22 are provided inside the rotary tool body 16. As shown in FIG. 7, when friction stir welding is performed, the filler 18 is supplied via the filler supply channels 24 and the filler 18 is ejected from the filler ejection holes 22 at the same time as the rotary tool 10 is moved, while being rotated. The filler 18 stays for a certain time in the groove 106 and mixes with the particles of the metal materials 100, 102, following the rotation of the rotary tool 10.

In the present embodiment, because the filler 18 is ejected from inside the rotary tool 10 into the joining portion 104, the filler 18 can be reliably supplied into the joining portion 104, and the configuration can be adapted for a case in which the position of the joining portion 104 changes or a case in which the direction in which the rotary tool 10 is inserted into the joining portion 104 is different from the vertical downward direction.

Figure 8:
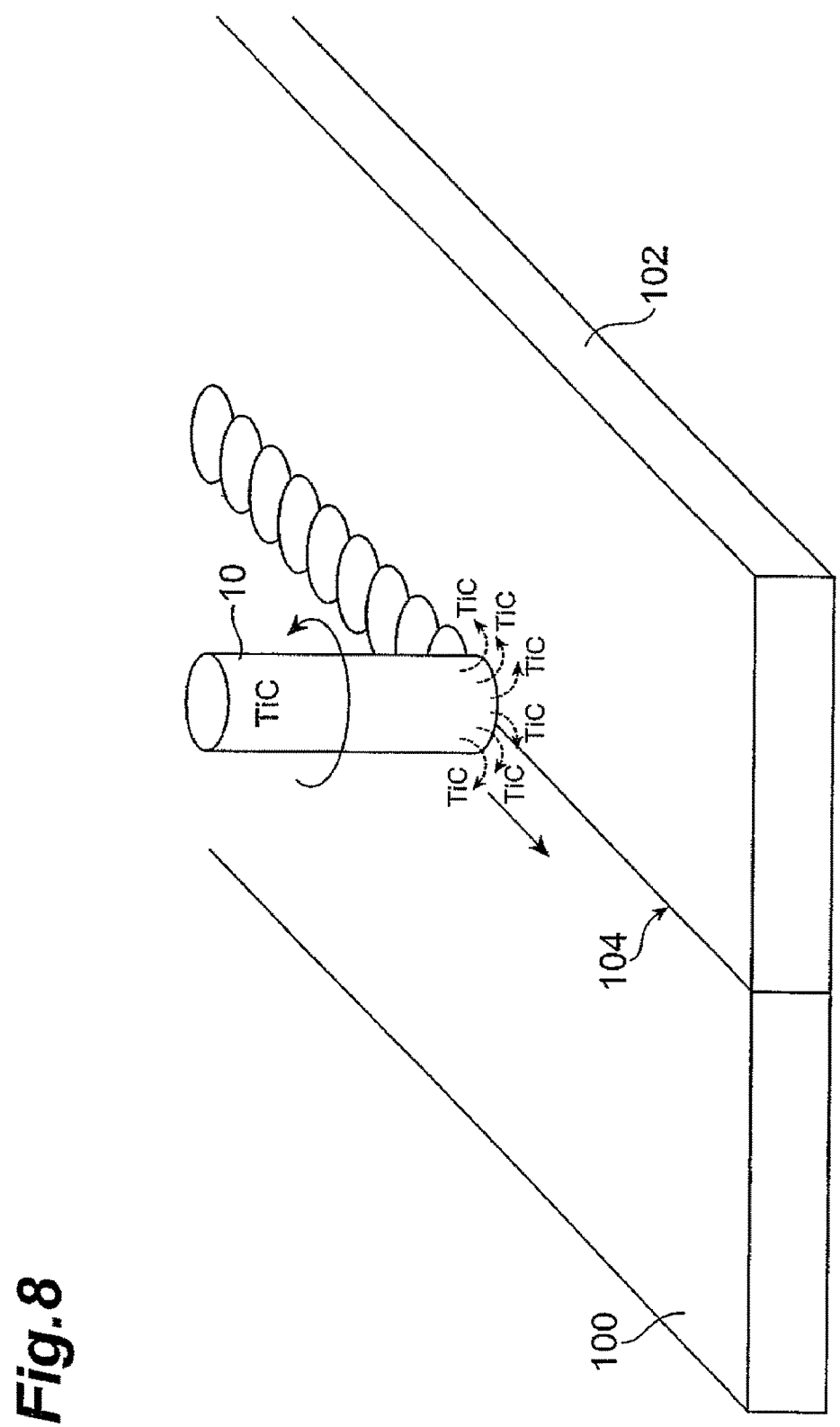
FIG. 8 is a perspective view illustrating a mode of friction stir welding of a fourth embodiment of the present invention.

A fourth embodiment of the present invention will be described below. FIG. 8 is a perspective view illustrating the mode of friction stir welding of the fourth embodiment of the present invention. The present embodiment differs from the above-described first embodiment in that the filler is introduced in advance in the material of the rotary tool 10 and the filler is supplied into the joining portion 104 as the rotary tool 10 wears down due to the rotation and movement of the rotary tool 10 along the longitudinal direction of the joining portion 104. In the present embodiment, the metal materials 100, 102 are Al materials, and the rotary tool 10 is composed of porous TiC. When the metal materials 100, 102 are an Al material, TiC is a substance that does not chemically react with the Al material, has a melting point higher than the melting point of the Al material and has a misfit with the Al material within ±15%. As shown in FIG. 8, because the rotary tool 10 moves, while rotating in the joining portion 104, the rotary tool 10 wears down and TiC that is a filler can be supplied into the joining portion 104. When the wear amount of the rotary tool 10 is large due to properties of the metal materials 100, 102, friction stir welding is performed using a rotary tool containing a filler only in the multiple processing portion 222 such as shown in FIG. 4, thereby making it possible to reduce the wear amount of the rotary tool 10 and extend the service life of the rotary tool 10.

In the present embodiment, because the filler is supplied into the joining portion 104 as the rotary tool 10 containing the filler wears down, the filler can be evenly supplied into the joining portion 104 and dispersivity of the filler can be further improved.

Figure 9:
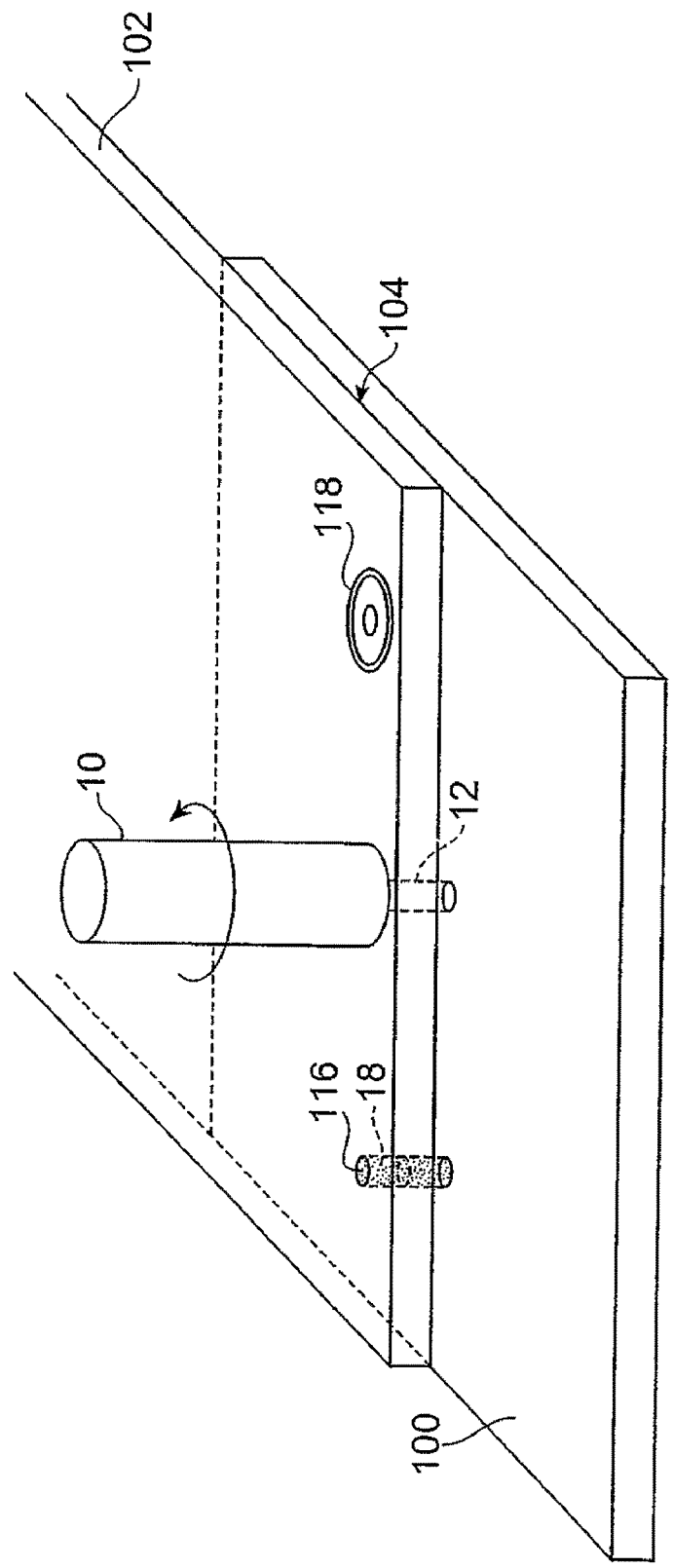
FIG. 9 is a perspective view illustrating a mode of friction stir welding of a fifth embodiment of the present invention.

A fifth embodiment of the present invention will be described below. FIG. 9 is a perspective view illustrating the mode of friction stir welding of the fifth embodiment of the present invention. The present embodiment differs from the above-described first to fourth embodiments in that the spot friction stir welding is performed without moving the rotary tool 10. As shown in FIG. 9, in the present embodiment, the metal materials 100, 102 are overlapped in the joining portion 104, an insertion hole 116 that passes at least through the metal material 102 is drilled, and the filler 18 is charged into the insertion hole 116 before the rotary tool 10 is inserted. Then, the probe 12 of the rotary tool 10 is inserted through the insertion hole 116 into the joining portion 104 and rotated to join the metal materials 100, 102. After such joining, the joint portion 118 such as shown in FIG. 9 is formed.

In the present embodiment, the overlapping metal materials 100, 102 can be joined together. Further, because the filler 18 is charged into the insertion hole 116 before the rotary tool 10 is inserted into the joining portion 104 via the insertion hole 116, the filler 18 can be easily and reliably supplied into the joining portion 104. The overlapping metal materials 100, 102 can be also joined together by friction stir welding by which the metal materials 100, 102 are joined, while rotating the rotary tool 10 inserted into the insertion hole 116 and moving the rotary tool along the longitudinal direction of the joining portion 104. Further, in the present embodiment, a method for supplying the filler 18 by ejecting the filler from the nozzle 20 as in the above-described second embodiment, a method for supplying the filler 18 by ejecting the filler from inside the rotary tool 10 as in the above-described third embodiment, and a method for supplying a filler into the joining portion 104 as the rotary tool 10 containing the filler 18 wears down as in the above-described fourth embodiment can be also used for supplying the filler 18 into the joining portion 104.

Test results obtained by the inventors in actually performing the processing of metal materials by the method for processing metal materials in accordance with the present invention will be explained below in comparison with the results obtained in welding by the conventional method.

TEST EXAMPLE 1

Figure 10:
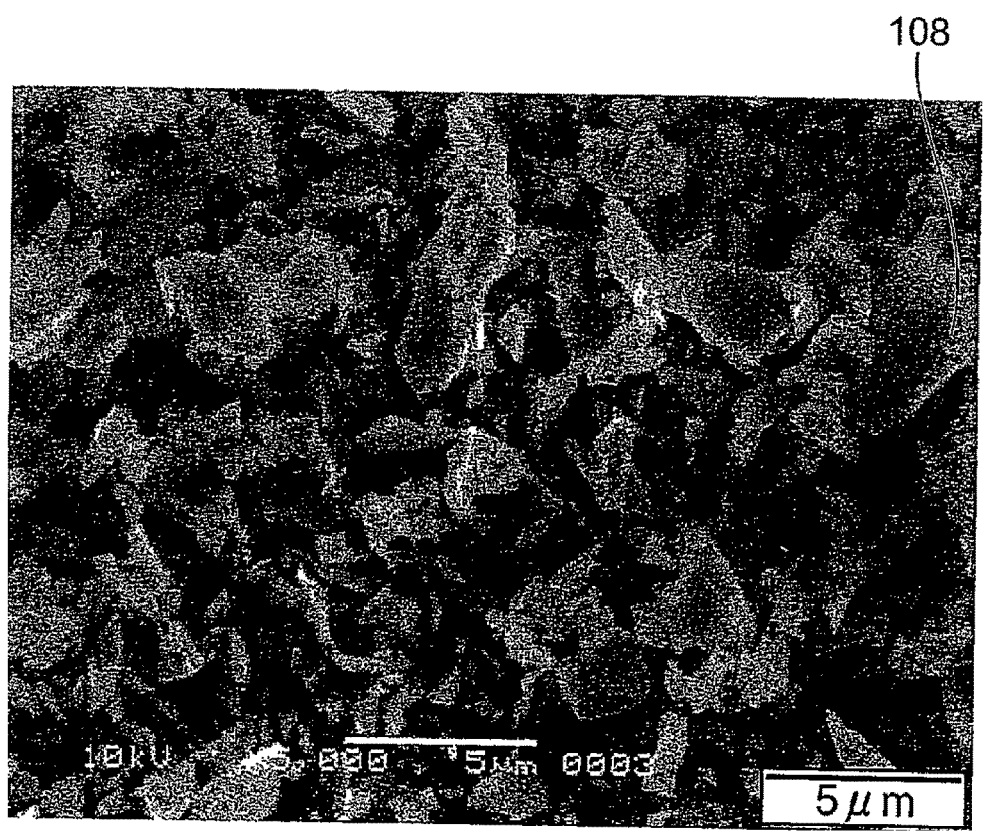
FIG. 10 illustrates SiC particles of the first test example of the present invention.

An AZ31 material (a Mg alloy containing Al 3% and Zn 1%) with a thickness of 6 mm was prepared. A groove with a width of 1 mm and a depth of 2 mm was formed at the surface of the prepared AZ31 material as an assumed joining portion where friction stir welding will be performed. A SiC powder 108 with a particle size of 0.5-5 μm and a mean particle size of 1 μm shown in FIG. 10 was charged into the formed groove. In the friction stir welding mode such as shown in FIG. 3, a probe 12 of a rotary tool 10 was inserted into the groove on the AZ31 material surface into which the SiC powder was charged, and a friction stir treatment was performed by moving the rotating rotary tool 10.

Figure 11:
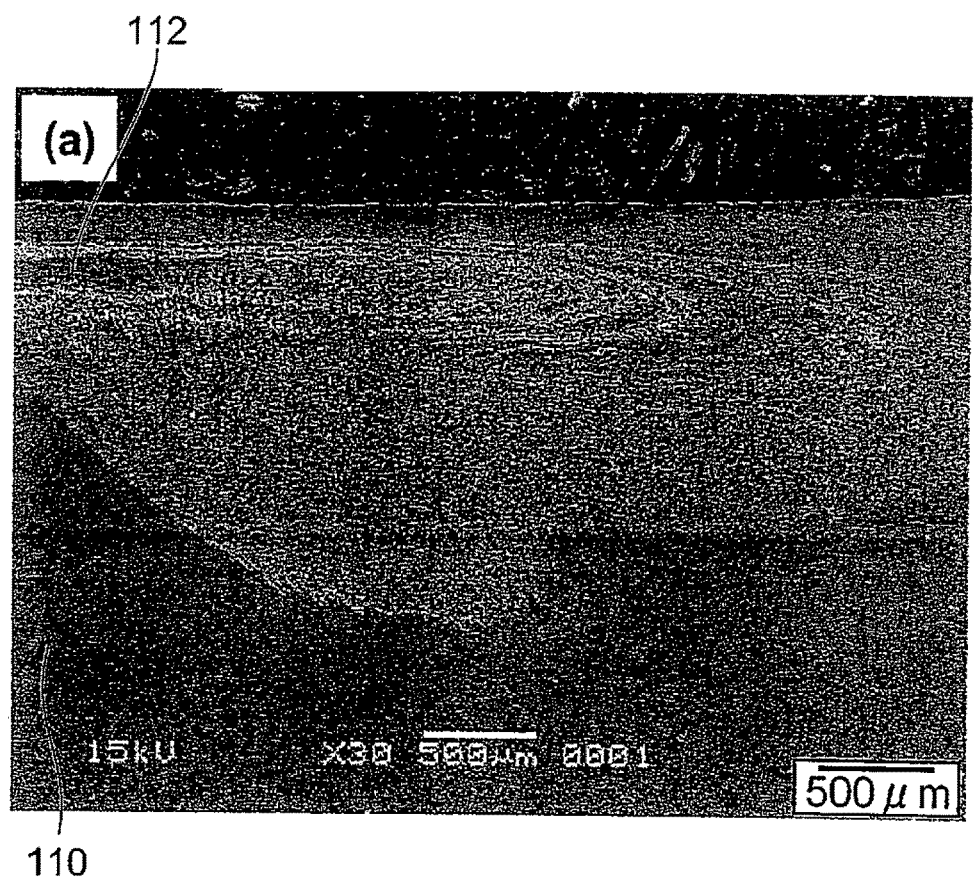
FIG. 11 illustrates the state of a zone where friction stir welding of Test Example 1 has been conducted.
Figure 12:
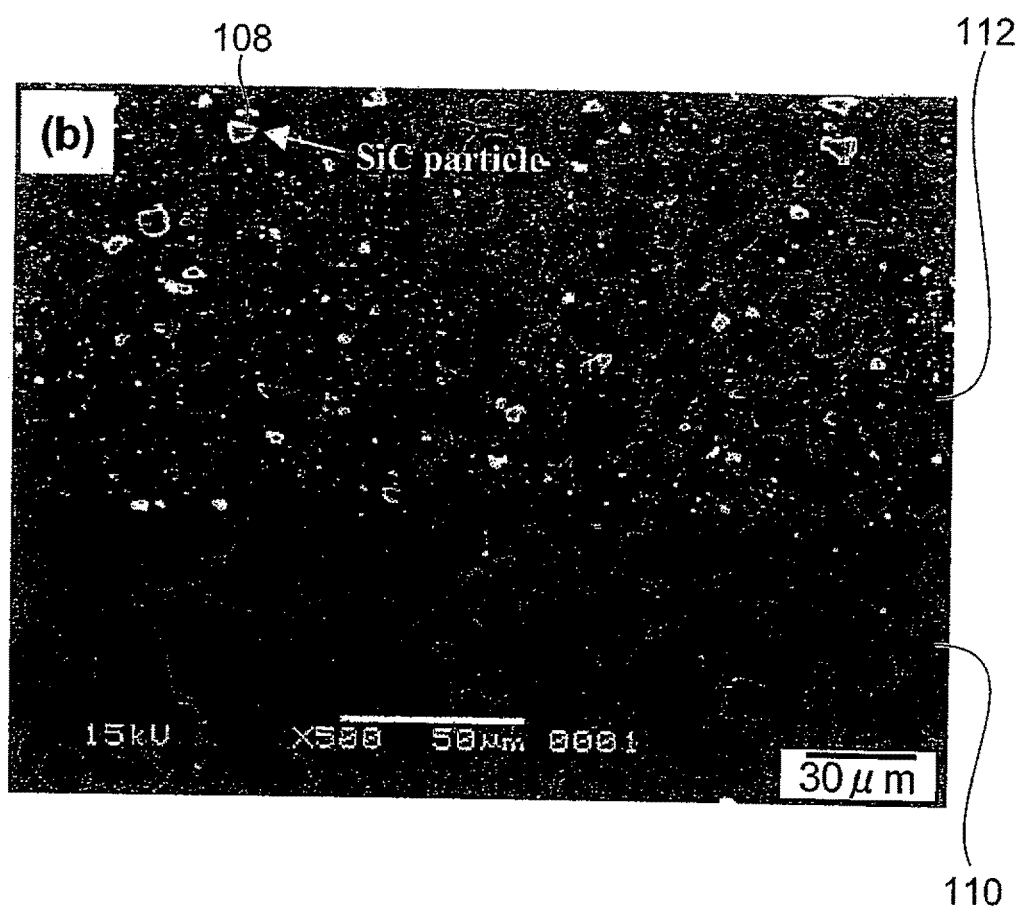
FIG. 12 is an enlarged drawing of an interface of a base material and a stirred zone of Test Example 1.

FIG. 11 illustrates the state of a zone where friction stir welding of the present test example was conducted. FIG. 12 is an enlarged drawing of an interface of a base material and a stirred zone. As shown in FIG. 11, it is clear that the state of crystal grains in a stirred zone 112 subjected to a friction stir treatment with the rotary tool 10 has changed with respect to that of the base material 110, which is the AZ31 material. Further, as shown on an enlarged scale in FIG. 12, the SiC particles 108 have admixed to the stirred zone 112.

On the other hand, an AZ31 material that was subjected to a similar friction stir treatment, without charging SiC particles into the groove, and an AZ31 material that was not subjected to the friction stir treatment were prepared for comparison. The following measurements and observations were performed with respect to the AZ31 materials of these three kinds.

Figure 13:
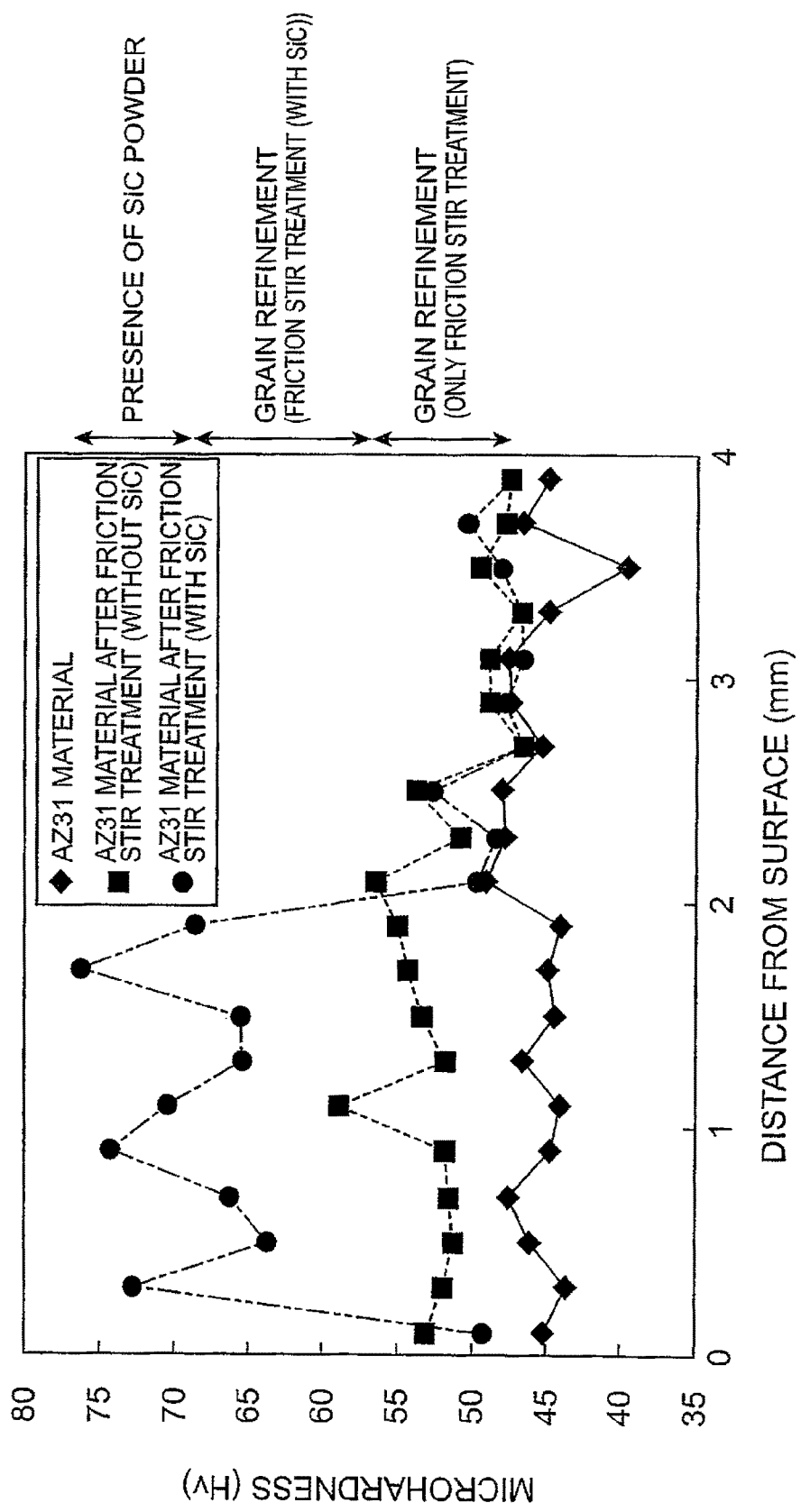
FIG. 13 is a graph illustrating a microhardness of the AZ31 material in Test Example 1.
Figure 14:
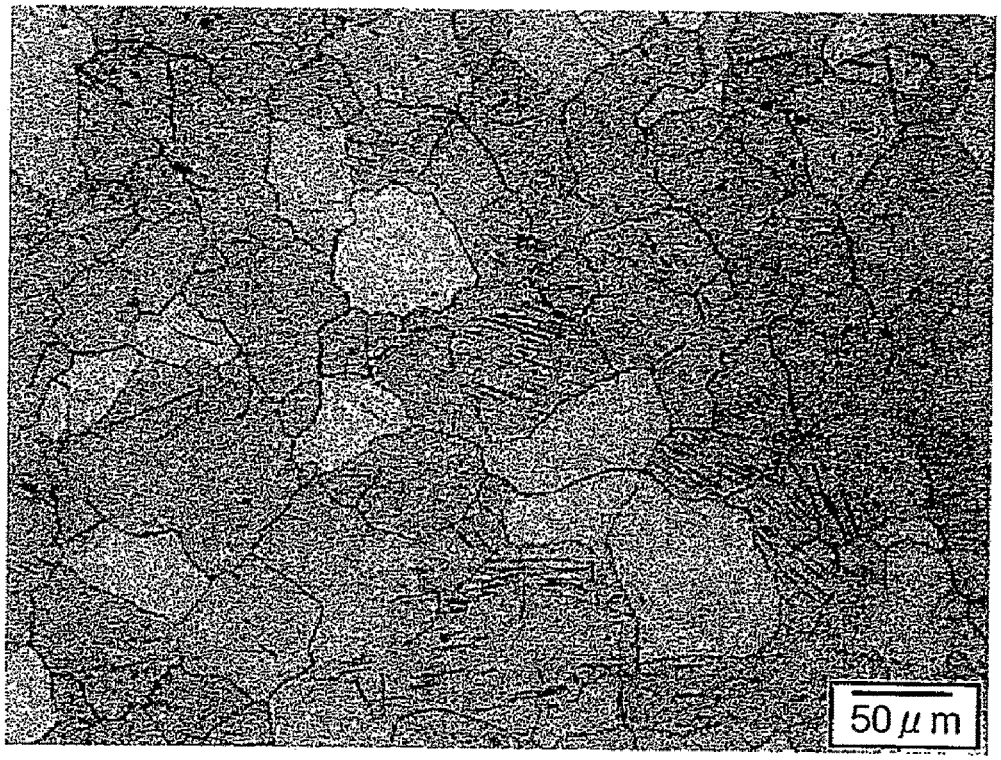
FIG. 14 illustrates crystal grains of the AZ31 material.
Figure 15:
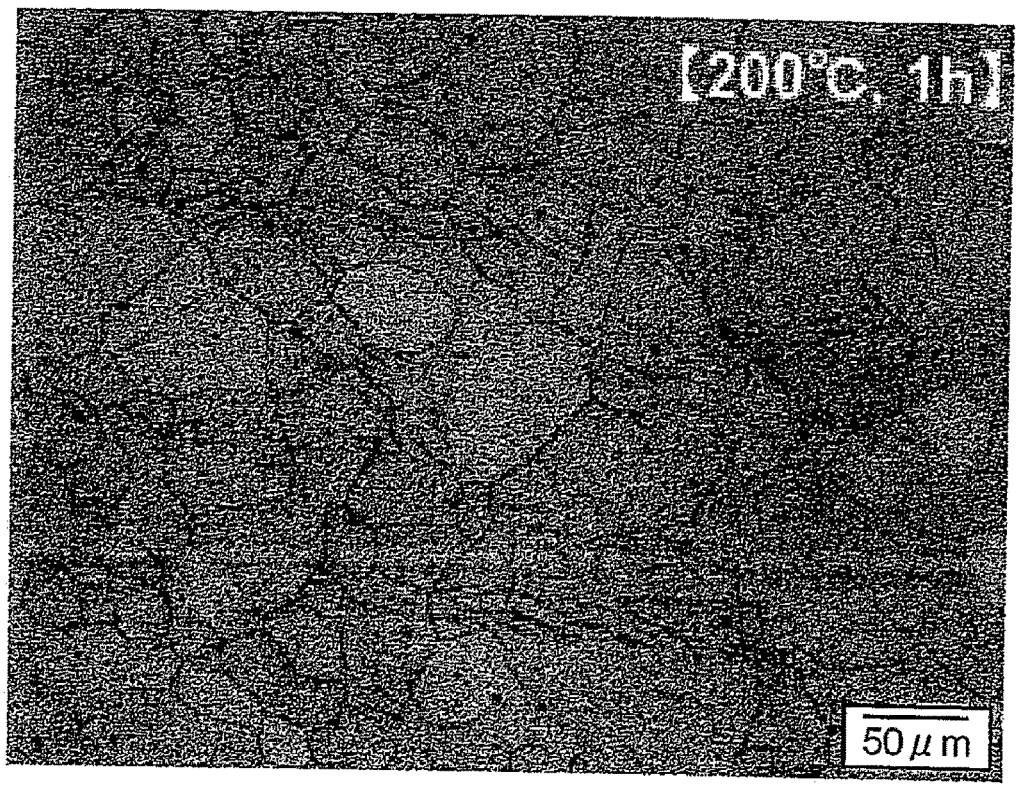
FIG. 15 illustrates crystal grains of the AZ31 material subjected to a heat treatment for 1 h at 200° C.
Figure 16:
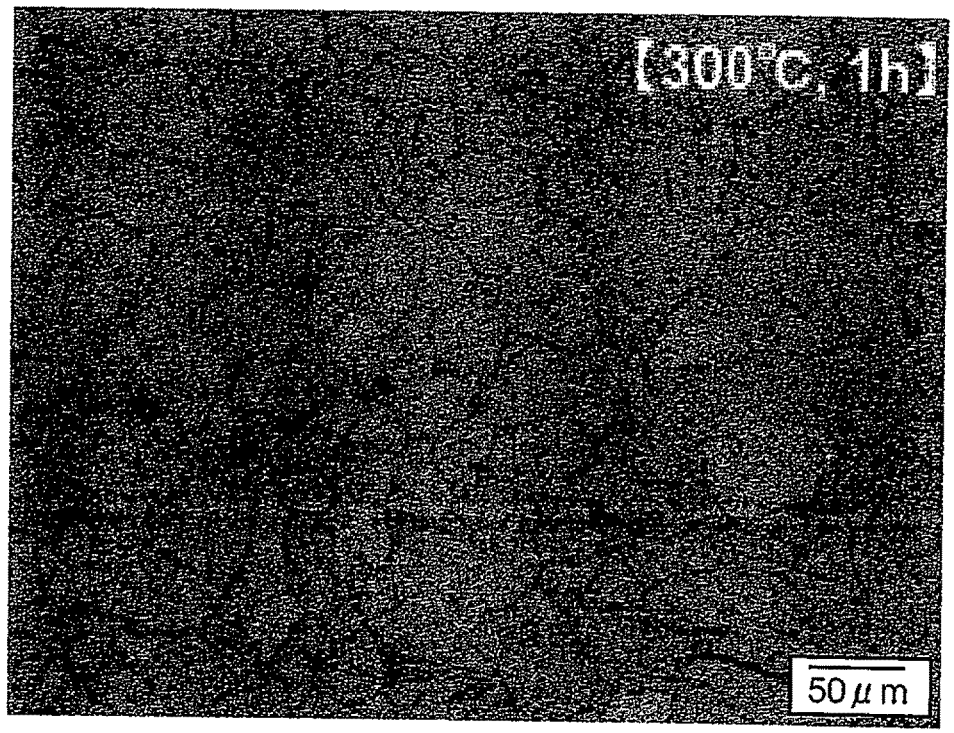
FIG. 16 illustrates crystal grains of the AZ31 material subjected to a heat treatment for 1 h at 300° C.
Figure 17:
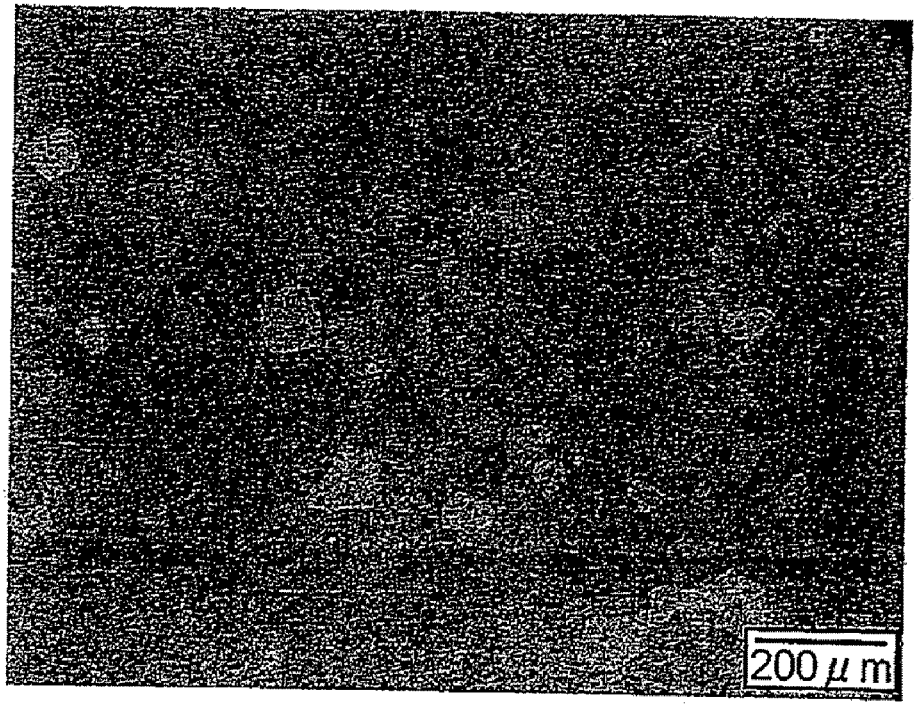
FIG. 17 illustrates crystal grains of the AZ31 material subjected to a heat treatment for 1 h at 400° C.
Figure 18:
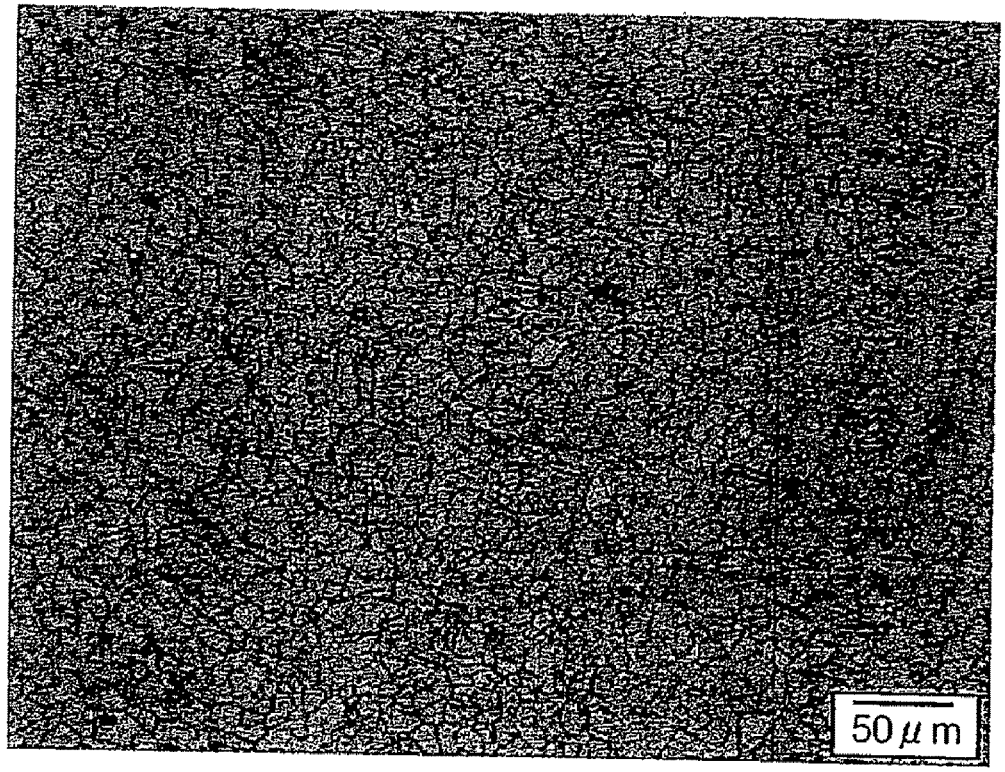
FIG. 18 illustrates crystal grains of the AZ31 material after a friction stir treatment.
Figure 19:
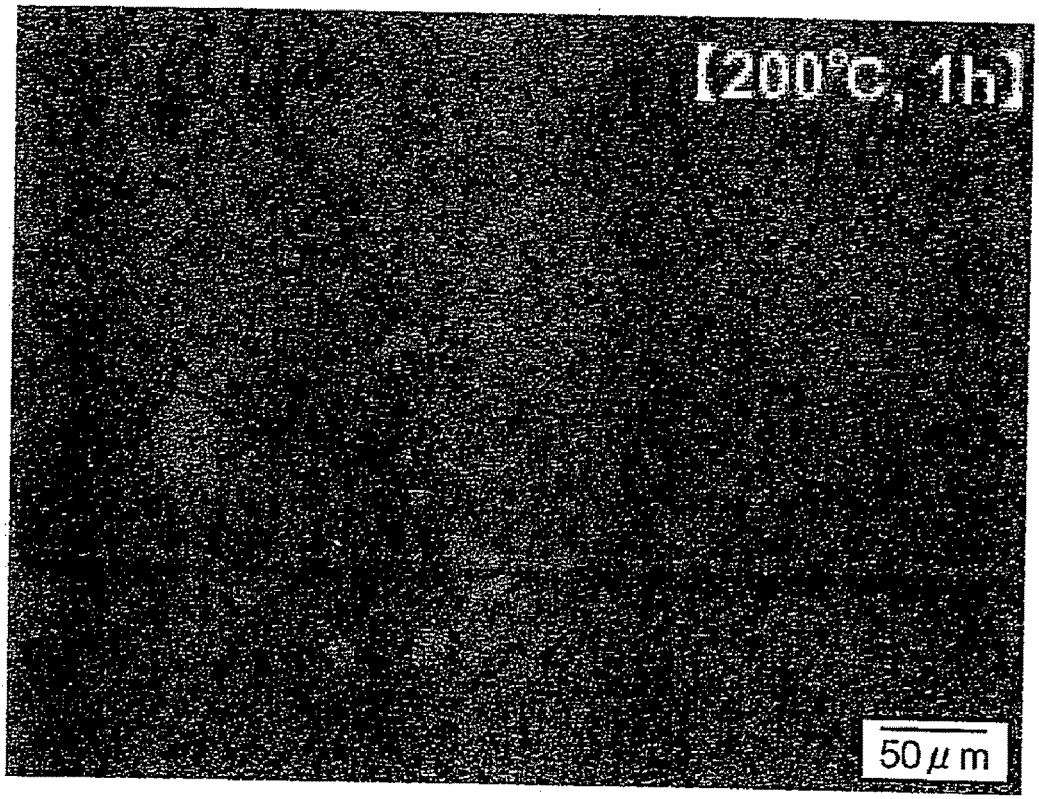
FIG. 19 illustrates crystal grains of the AZ31 material subjected to a heat treatment for 1 h at 200° C. after a friction stir treatment.
Figure 20:
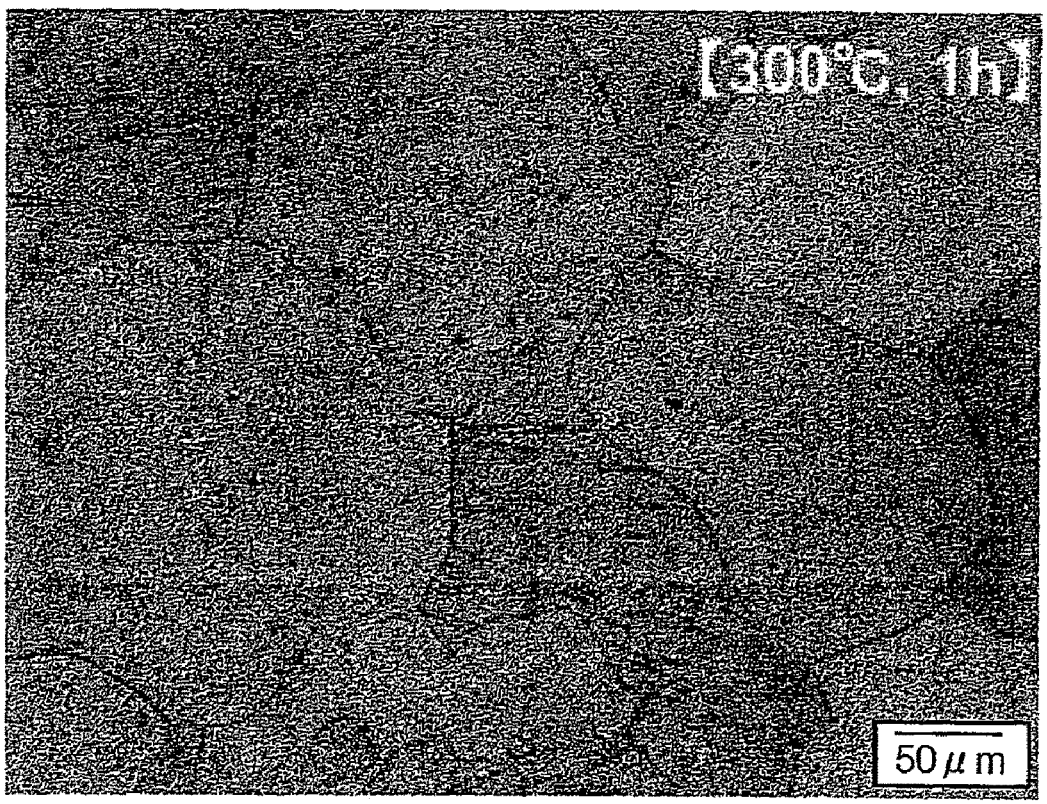
FIG. 20 illustrates crystal grains of the AZ31 material subjected to a heat treatment for 1 h at 300° C. after a friction stir treatment.
Figure 21:
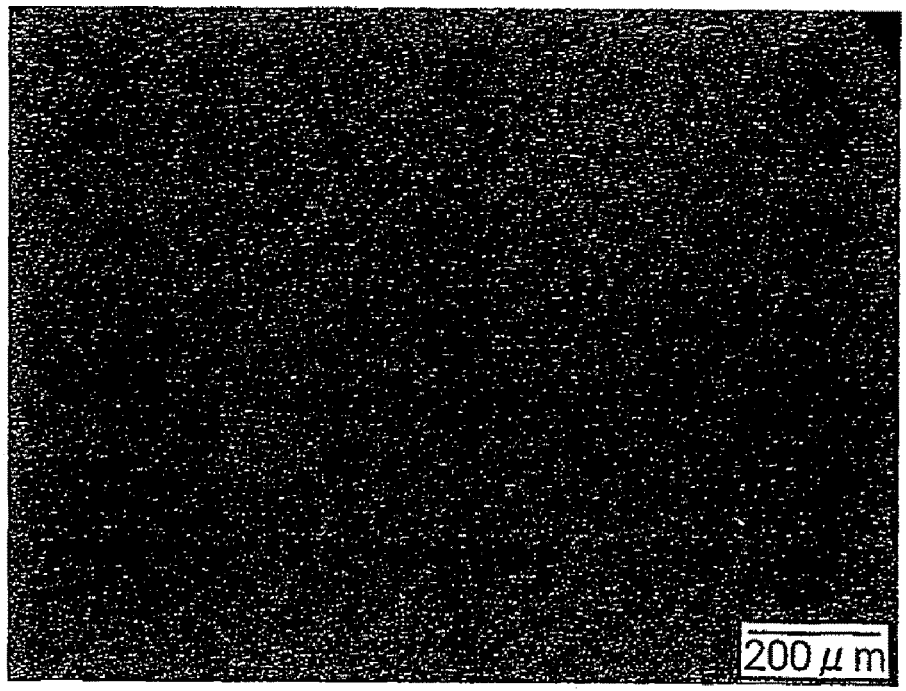
FIG. 21 illustrates crystal grains of the AZ31 material subjected to a heat treatment for 1 h at 400° C. after a friction stir treatment.
Figure 22:
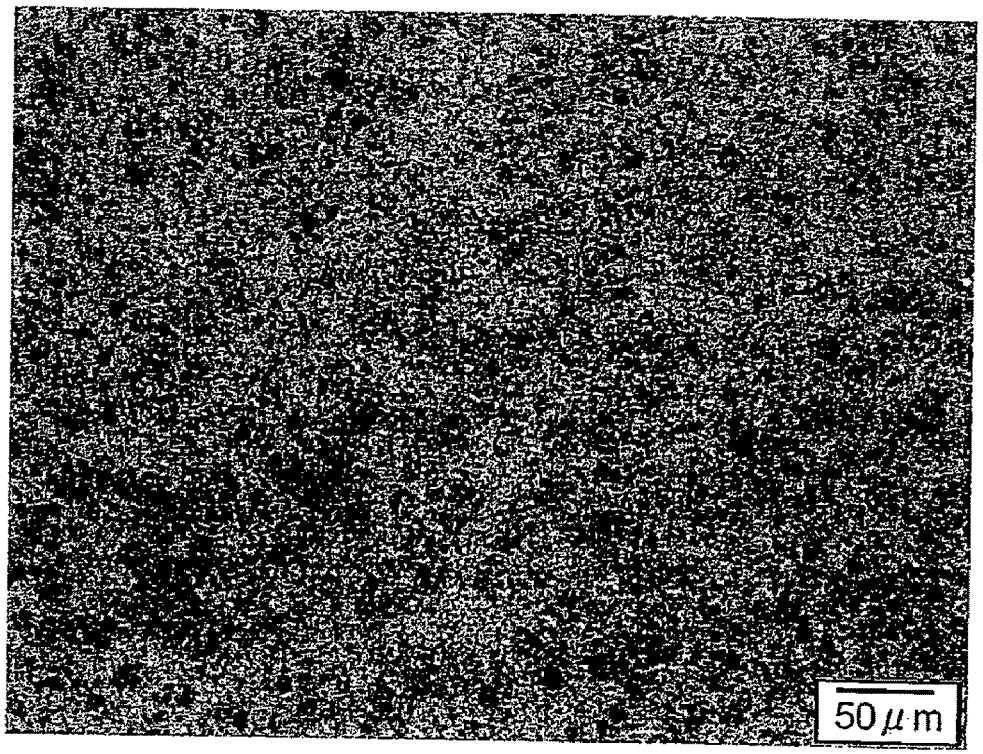
FIG. 22 illustrates crystal grains of the AZ31 material subjected to a heat treatment conducted with the addition of SiC.
Figure 23:
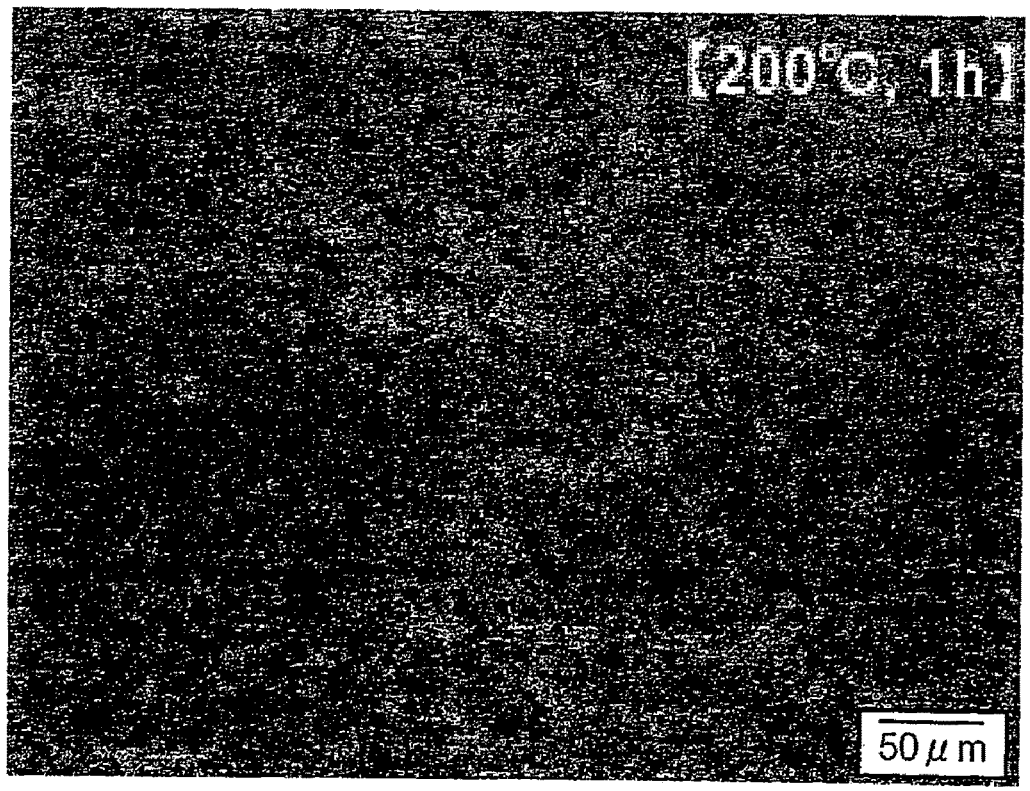
FIG. 23 illustrates crystal grains of the AZ31 material subjected to a heat treatment for 1 h at 200° C. after a friction stir treatment conducted with the addition of SiC.
Figure 24:
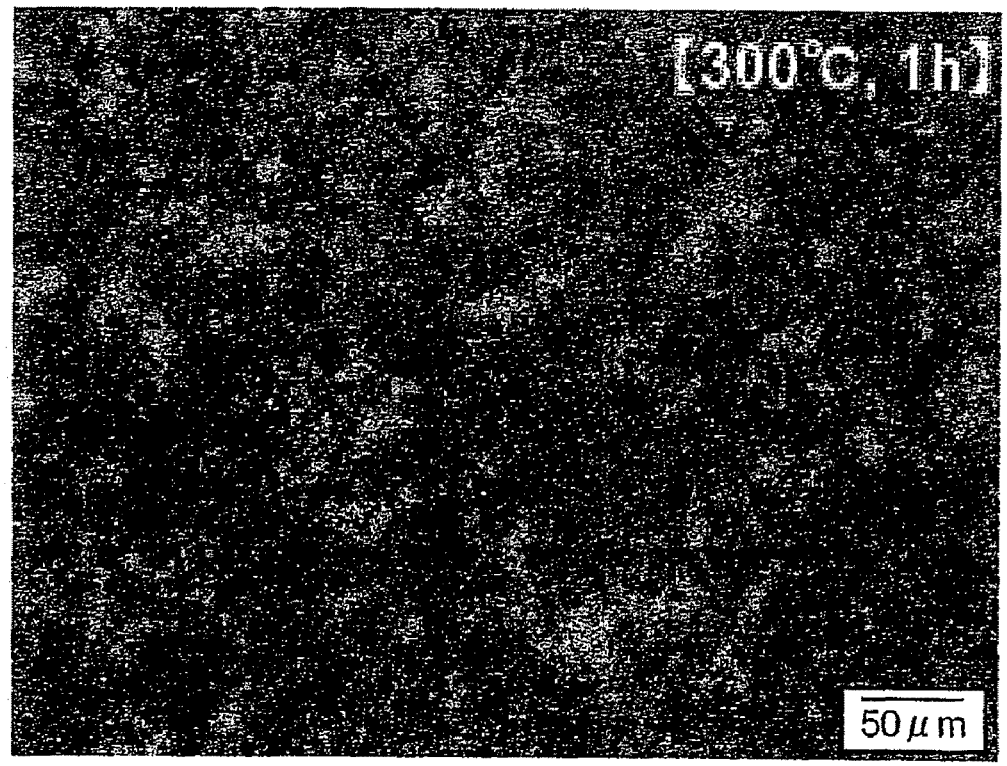
FIG. 24 illustrates crystal grains of the AZ31 material subjected to a heat treatment for 1 h at 300° C. after a friction stir treatment conducted with the addition of SiC.
Figure 25:
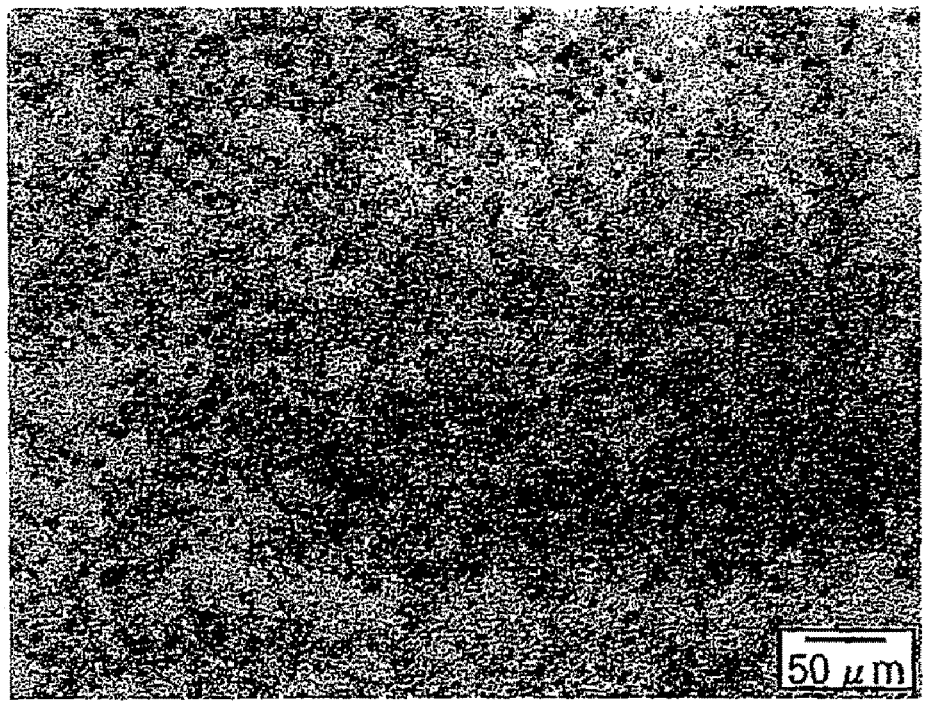
FIG. 25 illustrates crystal grains of the AZ31 material subjected to a heat treatment for 1 h at 400° C. after a friction stir treatment conducted with the addition of SiC.

FIG. 13 is a graph illustrating a microhardness of the AZ31 material in the present test example. As shown in FIG. 13, it is clear that the microhardness of the AZ31 material that was not subjected to the friction stir treatment is 40-50 Hv, whereas, the microhardness of the AZ31 material subjected to the friction stir treatment increased to 52-57 Hv in a zone that was stirred from the surface to a depth of 2 mm. Further, FIG. 13 also demonstrates, that the microhardness of the AZ31 material that was subjected to friction stir treatment after charging a SiC powder into the groove increased to a maximum of 77 Hv in a zone from the surface to a depth of 2 mm into which SiC was added.

Then, a heat treatment for 1 h at 200° C., a heat treatment or 1 h at 300° C., and a heat treatment for 1 h at 400° C. were conducted as a fusion processing modes on each of the three kinds of AZ31 materials, and observations and measurements were performed with respect to each AZ31 material subjected to heat treatment.

FIGS. 14 to 17 show crystal grains of the AZ31 material that has not been subjected to a heat treatment, AZ31 material subjected to a heat treatment for 1 h at 200° C., AZ31 material subjected to a heat treatment for 1 h at 300° C., and AZ31 material subjected to a heat treatment for 1 h at 400° C. As shown in FIGS. 14 to 17, the variation of crystal grain size is small even when the temperature of heat treatment of the AZ31 material increases.

FIGS. 18 to 21 show crystal grains of the AZ31 material after a friction stir treatment, AZ31 material subjected to a heat treatment for 1 h at 200° C. after a friction stir treatment, AZ31 material subjected to a heat treatment for 1 h at 300° C. after a friction stir treatment, and AZ31 material subjected to a heat treatment for 1 h at 400° C. after a friction stir treatment. As shown in FIGS. 18 to 21, the size of crystal grains increases over that in the base material with the increase in the temperature of heat treatment of the AZ31 material subjected to a friction stir treatment. This is apparently because the crystal grains that have strains introduced by the friction stir treatment are recrystallized and coarsened by heat of the heat treatment.

Figure 26:
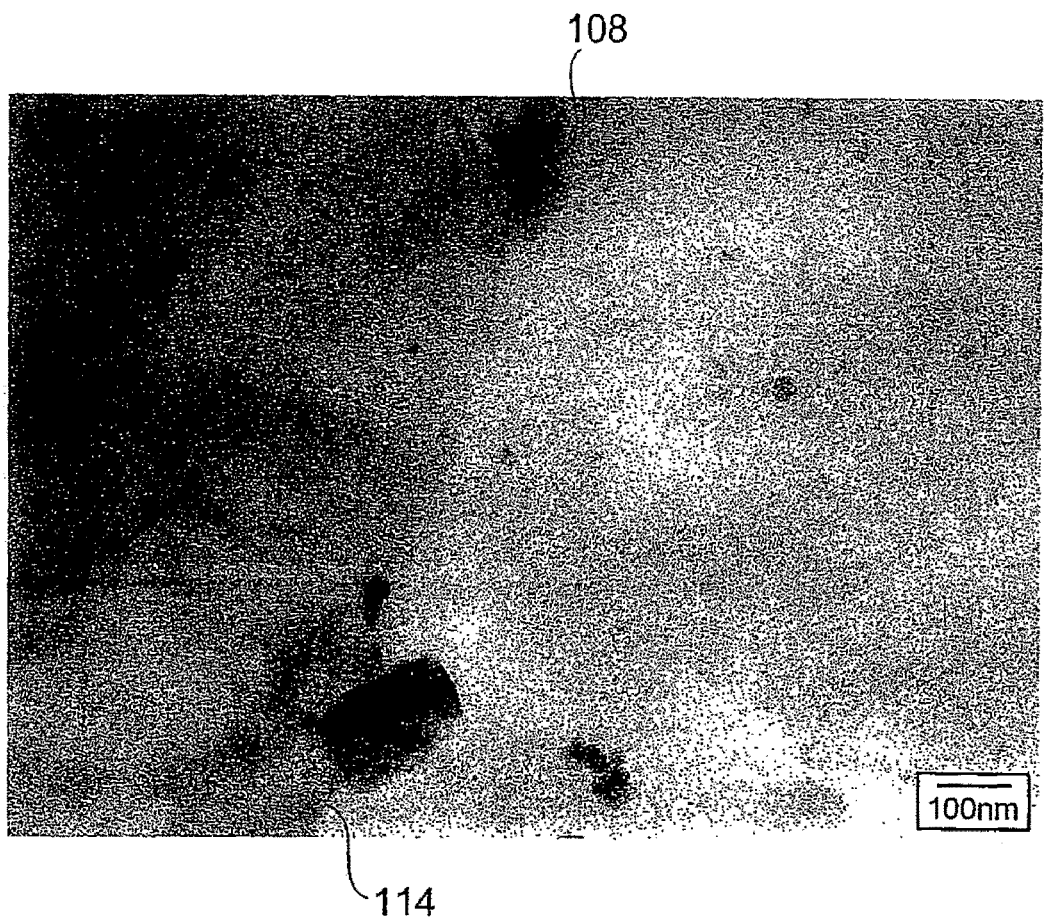
FIG. 26 an enlarged drawing illustrating a boundary of crystal grains of the AZ31 material subjected to a heat treatment after a friction stir treatment conducted with the addition of SiC.

FIGS. 22 to 25 show crystal grains of the AZ31 material subjected to a heat treatment conducted with the addition of SiC, AZ31 material subjected to a heat treatment for 1 h at 200° C. after a friction stir treatment conducted with the addition of SiC, AZ31 material subjected to a heat treatment for 1 h at 300° C. after a friction stir treatment conducted with the addition of SiC, and AZ31 material subjected to a heat treatment for 1 h at 400° C. after a friction stir treatment conducted with the addition of SiC. As shown in FIGS. 22 to 25, no coarsening of crystal grains occurs even when the heat treatment temperature rises. FIG. 26 an enlarged drawing illustrating a boundary of crystal grains of the AZ31 material subjected to a heat treatment after a friction stir treatment conducted with the addition of SiC. As shown in FIG. 26, because SiC particles 108 are accumulated on a crystal grain boundary 114 and apply a pressure to those crystal grains that are induced to be coarsened by the heat, the coarsening of crystal grains is inhibited.

Figure 27:
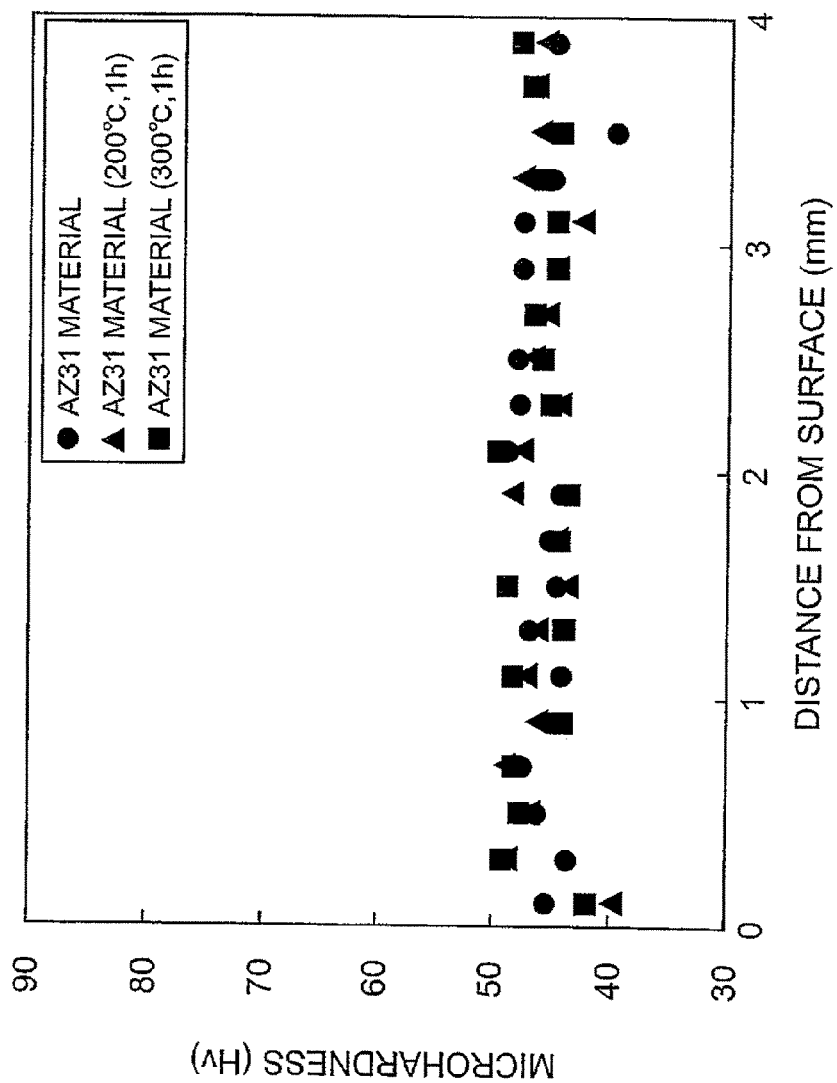
FIG. 27 is a graph illustrating a microhardness of the AZ31 material before and after a heat treatment.
Figure 28:
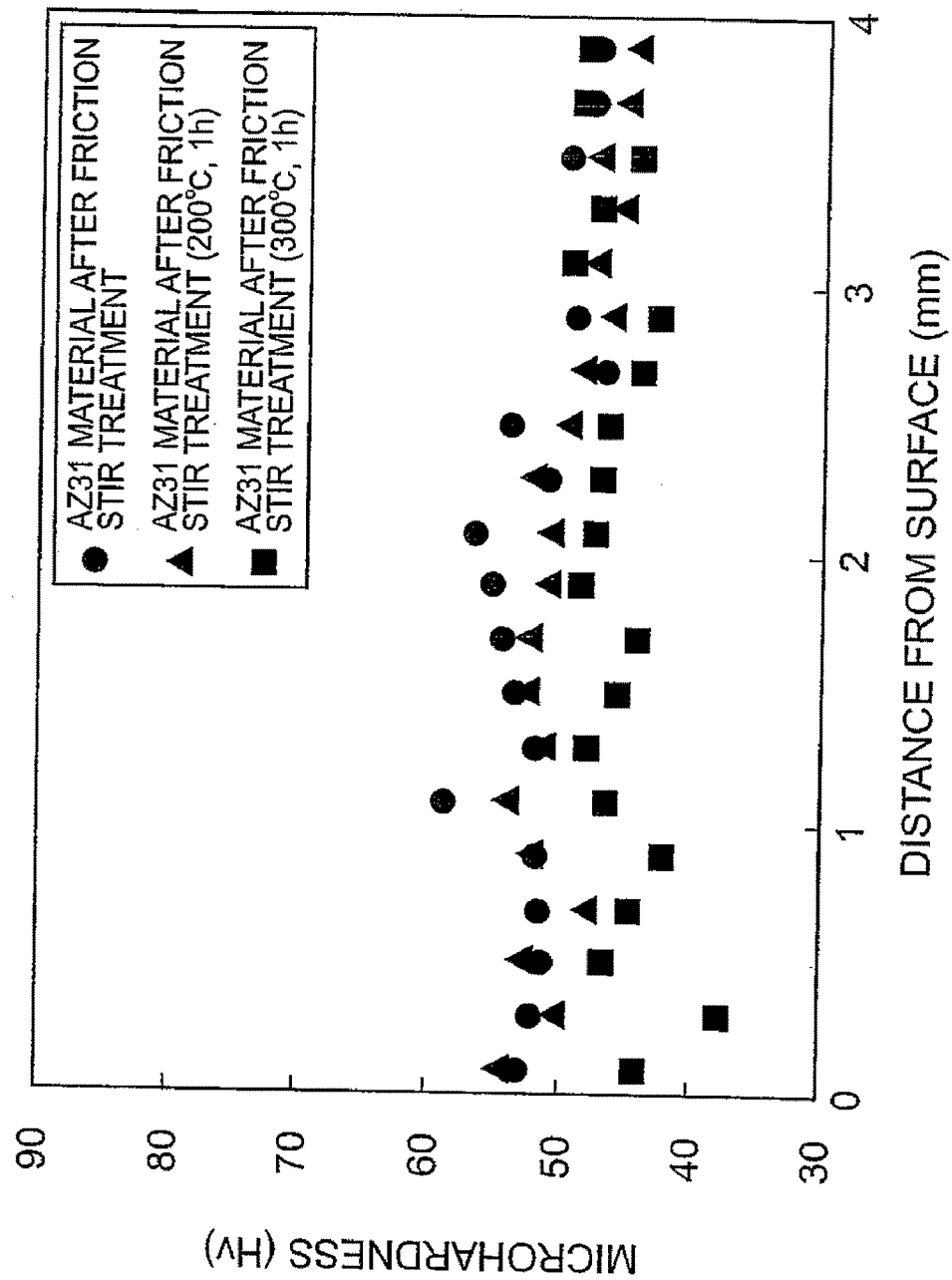
FIG. 28 is a graph illustrating a microhardness before and after heat treatment of the AZ31 material subjected to a friction stir treatment.
Figure 29:
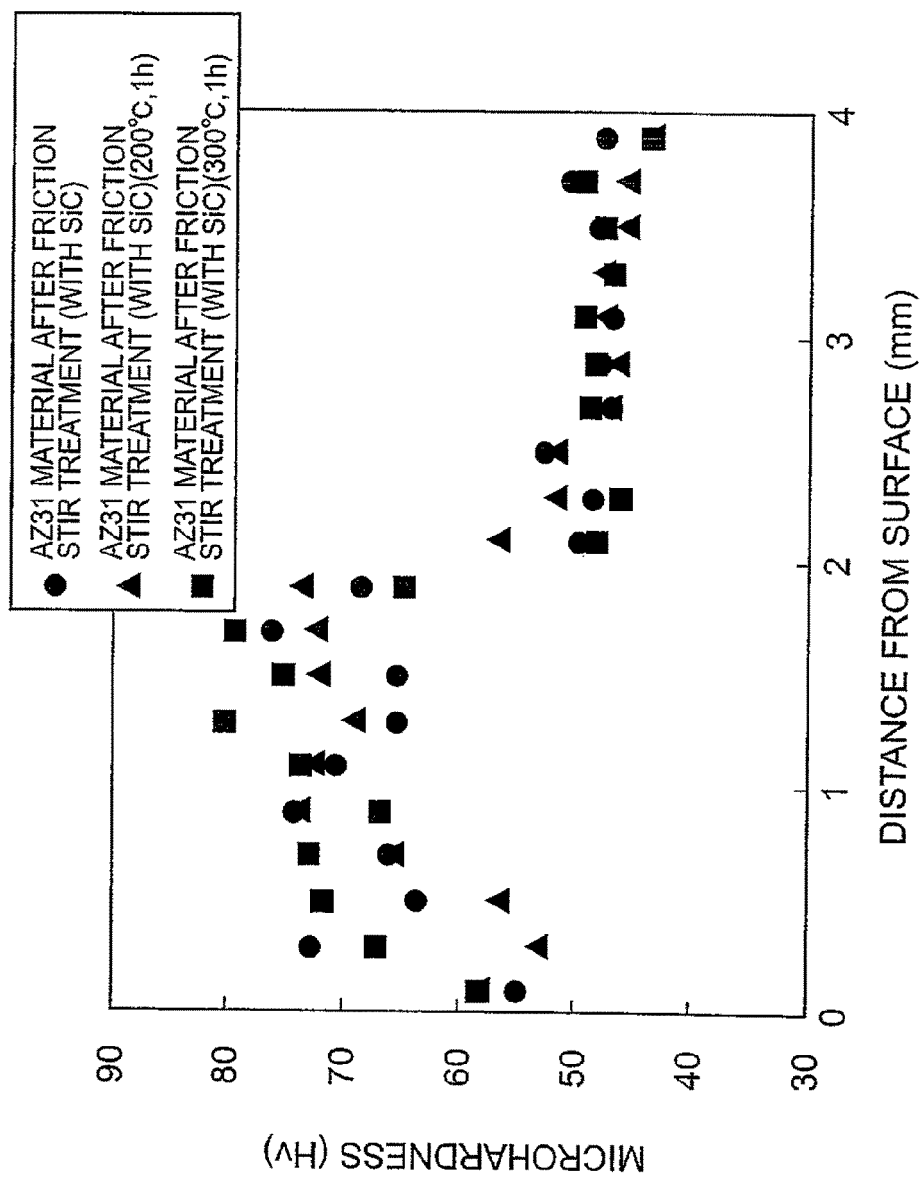
FIG. 29 is a graph illustrating a microhardness before and after heat treatment of the AZ31 material subjected to a friction stir treatment conducted with the addition of SiC.

FIGS. 27 to 29 are graphs illustrating a microhardness before and after respective heat treatment of the AZ31 material, AZ31 material subjected to a friction stir treatment, and AZ31 material subjected to a friction stir treatment conducted with the addition of SiC. As shown in FIG. 27, the AZ31 material that has not been subjected to a friction stir treatment demonstrates small difference in microhardness measured before and after the heat treatment. However, as shown in FIG. 28, in the AZ31 material after the friction stir treatment, the microhardness decreases with the increase in heat treatment temperature. On the other hand, as shown in FIG. 29, in the AZ31 material subjected to a friction stir treatment conducted with the addition of SiC, the microhardness does not decrease in a zone from the surface to a depth of 2 mm to which SiC was added.

Figure 30:
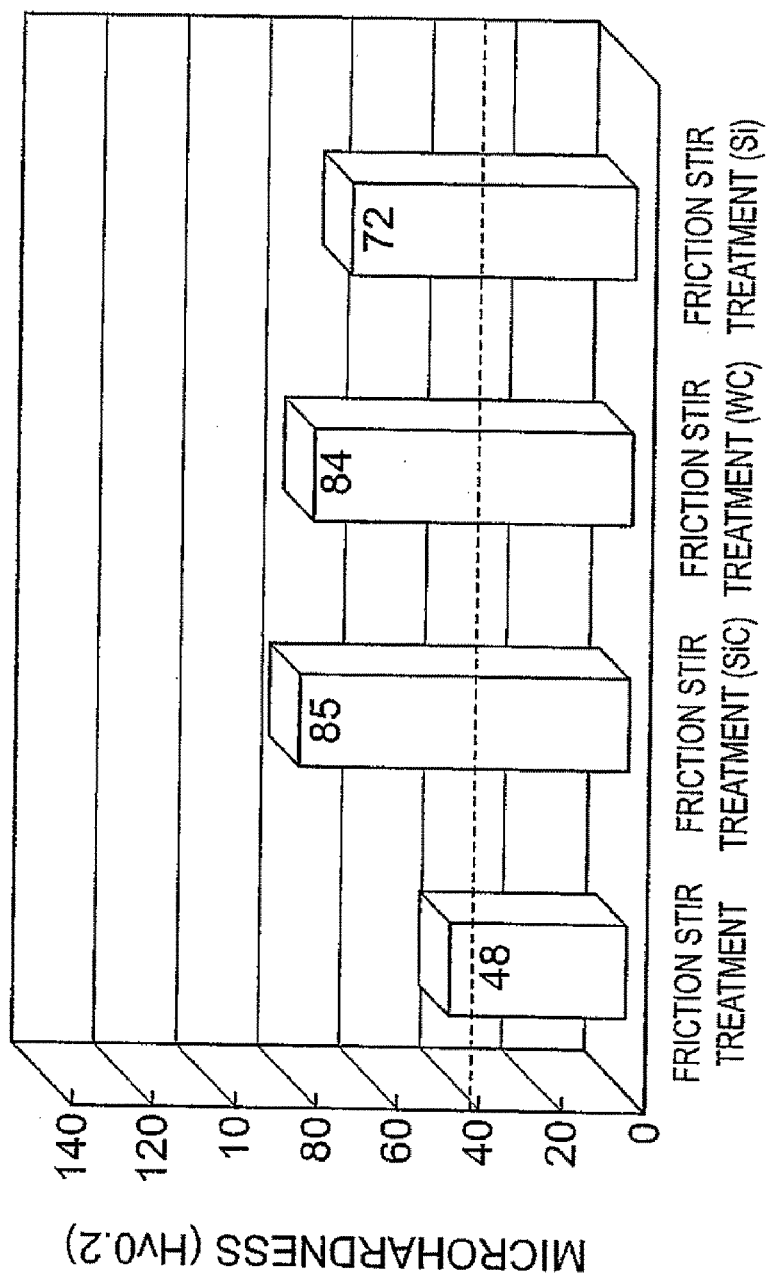
FIG. 30 is a graph illustrating a microhardness of the AZ31 material subjected to a friction stir treatment conducted with the addition of various fillers.

Further, an AZ31 material with a thickness of 6 mm that had a groove with a width of 1 mm and a depth of 2 mm on the surface was prepared, powdered SiC, WC, Si were charged into the groove, a friction stir treatment was conducted in the same manner as described above, and the microhardness was measured. FIG. 30 is a graph illustrating the microhardness of the AZ31 material subjected to a friction stir treatment conducted with the addition of various fillers. The broken line in the figure shows the microhardness at 41 of the AZ31 material itself. As shown in FIG. 30, the microhardness of AZ31 materials subjected to a friction stir treatment upon addition of respective fillers increased. Further, because WC and Si are the substances that do not chemically react with the AZ31 material and have a melting point higher than that of the AZ31 material, similarly to SiC, the coarsening of crystal grains is inhibited and the decrease in microhardness is inhibited even when these AZ31 material are subjected to a fusion processing.

TEST EXAMPLE 2

An A1050 material, which is a material conforming to JIS H 4000, with a thickness of 6 mm was prepared. Similarly to the above-described Test Example 1, a groove with a width of 1 mm and a depth of 2 mm was formed at the surface, a SiC powder was charged into the groove, and a friction stir treatment was performed. The A1050 material subjected to the friction stir treatment was heat treated for 1 h at 300° C. For comparison, the heat treatment for 1 h at 300° C. was also performed with respect to an A1050 material subjected to friction stir treatment without the addition of SiC powder and an A1050 material that was not subjected to a friction stir treatment. The microhardness of the A1050 materials was measured before and after the heat treatment.

Figure 31:
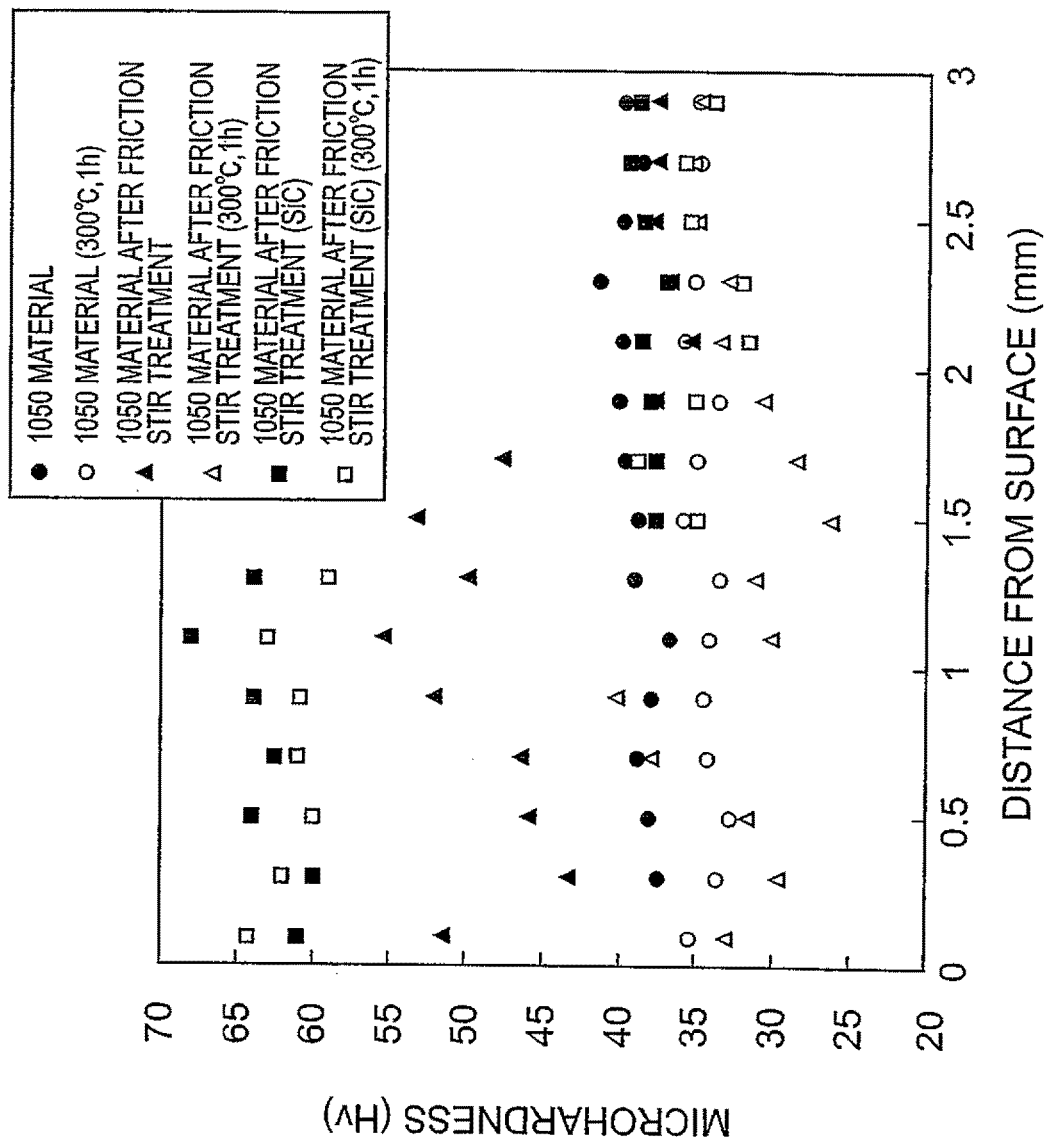
FIG. 31 is a graph illustrating a microhardness of the A1050 material in Test Example 2.

FIG. 31 is a graph illustrating the microhardness of the A1050 materials in the present test example. As shown in FIG. 31, in the A1050 material that was not subjected to a friction stir treatment, the difference in microhardness before and after the heat treatment is small, but in the A1050 material subjected to a friction stir treatment, the microhardness decreases greatly after the heat treatment. On the other hand, in the A1050 material subjected to a friction stir treatment with the addition of SiC, the difference in microhardness before and after the heat treatment is small.

TEST EXAMPLE 3

Two A1050 materials, which are materials conforming to JIS H 4000, with a thickness of 5 mm were prepared. As shown in FIG. 3, the A1050 materials were abutted in the joining portion, a TiC powder with an average particle size of 1 μm was charged into the joining portion, and friction stir welding was conducted at a revolution speed of a rotary tool of 500 rpm and a joining speed of 500 mm/min. The width of the joining portion obtained by the friction stir welding is 10 mm on the surface of the A1050 material. A melt-run welding was then performed by TIG welding at a joining speed of 200 mm/min at 180 A parallel into the joining portion from above the joining portion obtained by the friction stir welding. The width of the molten range was about 6 mm in the center of the A1050 material sheet in the thickness direction thereof. A hardness in the central portion of the sheet in the thickness direction in the transverse cross-section of the joining portion was thereafter measured with a pitch of 0.3 mm.

Figure 32:
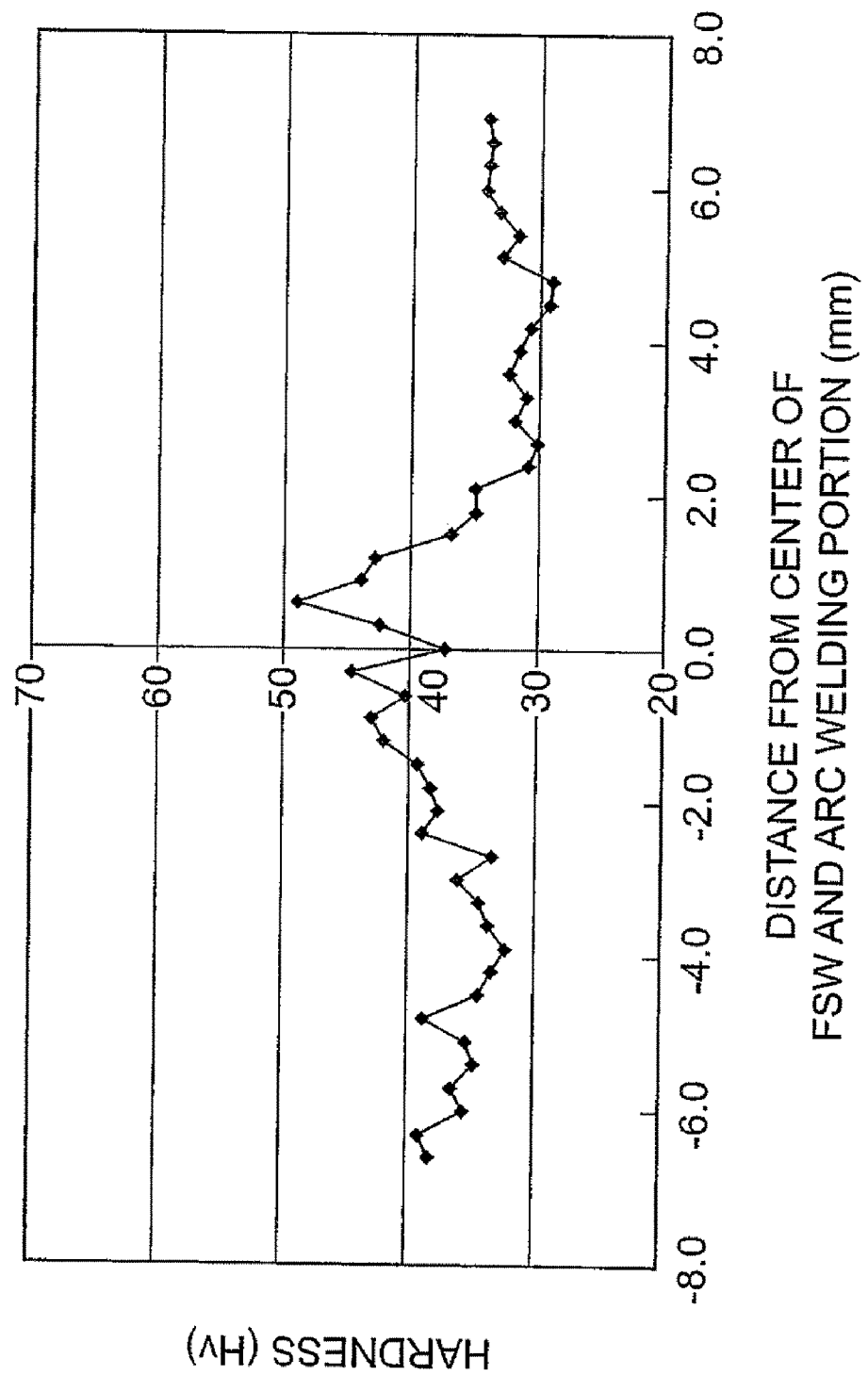
FIG. 32 is a graph illustrating a hardness of the joining portion of the A1050 material in Test Example 3.

FIG. 32 is a graph illustrating a hardness of the joining portion of the A1050 material in Test Example 3, As shown in FIG. 32, in a ±2.5 mm range from the joining portion obtained by performing TIG welding on the joining portion produced by friction stir welding, the hardness is higher than in the surrounding base metal. This range matches the region in which TiC particles have been dispersed.

Figure 33:
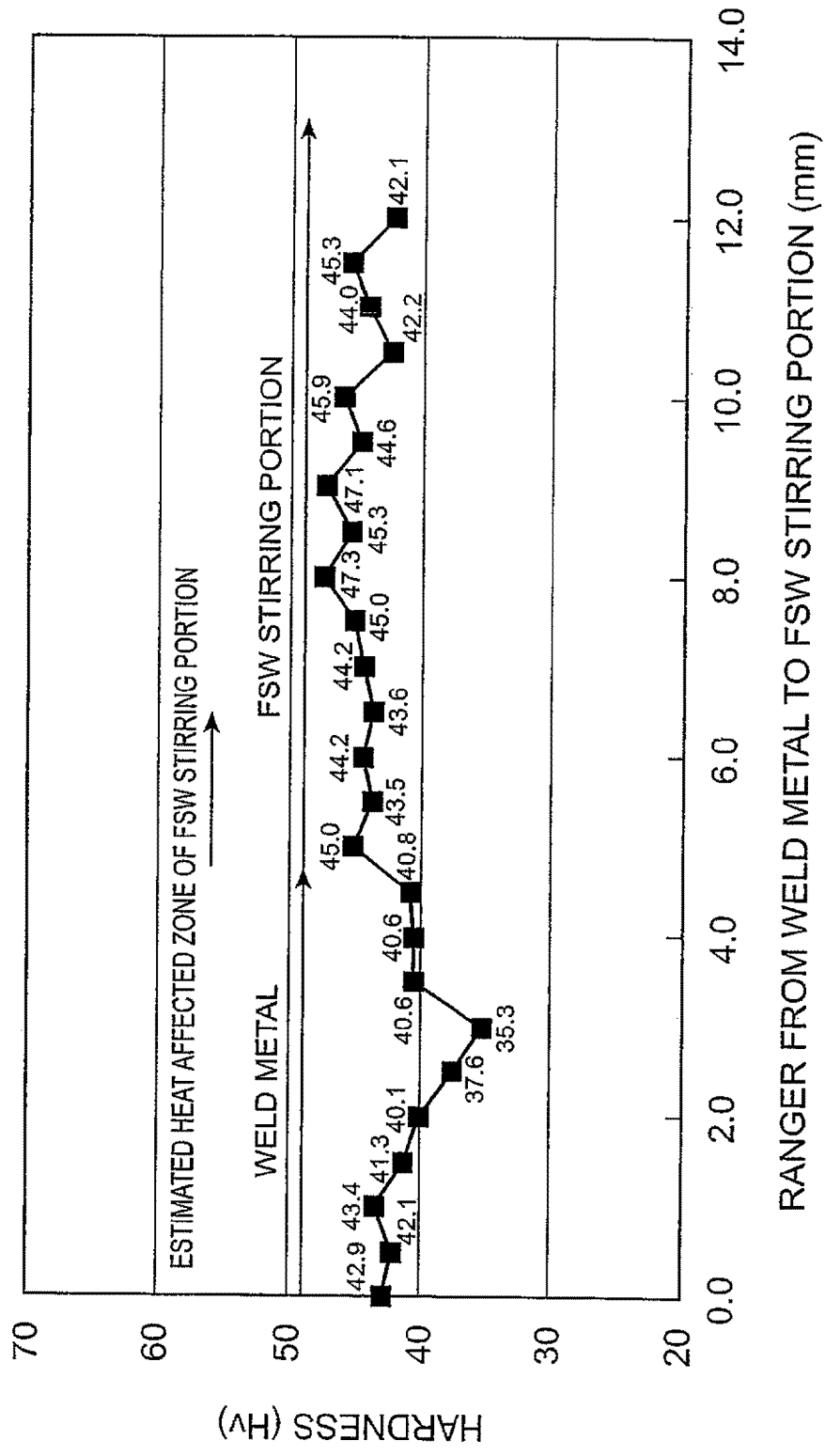
FIG. 33 is a graph illustrating a hardness distribution at a boundary of the fusion joining portion and friction stir welding portion of the A1050 material in Test Example 3.

After the A1050 material has been subjected to friction stir welding identical to that described hereinabove, a melt-run welding was performed by TIG welding at 180 A so as to cross the joining portion obtained by friction stir welding in the direction perpendicular thereto. FIG. 33 is a graph illustrating a hardness distribution at a boundary of the fusion joining portion and friction stir welding portion of the A1050 material in Test Example 3, The figure shows hardness distributions in a cross section parallel to the longitudinal direction of friction stir welding and perpendicular to the longitudinal direction of the fusion joining portion. As shown in FIG. 33, in the fusion joining portion, a solidification texture composed of fine crystal grains is obtained, hardness decrease is practically zero, grain growth is inhibited even in the heat-affected zone of the fusion joining, and hardness variations are completely absent. Thus, it is clear that even when a fusion welding is performed on the joining portion obtained by friction stir welding, no hardness (strength) decrease is obtained in the entire joining portion including the proximity thereof.

The method for processing metal materials is not limited to the above-described embodiments and it goes without saying that various modifications can be added without departing from the essence of the present invention.

The invention claimed is:

1. A method for processing metal materials, comprising:
a first step of disposing two metal materials opposite each other in a joining portion, inserting a rod-shaped rotary tool into the joining portion, rotating the rotary tool, and joining the two metal materials, while supplying into the joining portion a filler that does not chemically react with the metal materials and has a melting point higher than a melting point of the metal materials; and
a second step of further performing a fusion processing in the joining portion, wherein the filler supplied in the first step is dispersed during the fusion processing.

2. A method for processing metal materials, comprising:
a first step of disposing two metal materials opposite each other in a joining portion, inserting a rod-shaped rotary tool into the joining portion, rotating the rotary tool, and joining the two metal materials, while supplying into the joining portion a filler in which either an integer multiple or 1/integer multiple of a length (a') of a crystal edge of a unit crystal lattice is within ±15% a length (a) of a crystal edge of a unit crystal lattice of the metal materials; and a second step of further performing a fusion processing in the joining portion, wherein the filler supplied in the first step is dispersed during the fusion processing.

3. A method for processing metal materials, comprising:

a first step of disposing two metal materials opposite each other in a joining portion, inserting a rod-shaped rotary tool into the joining portion, rotating the rotary tool, and joining the two metal materials, while supplying into the joining portion a filler that does not chemically react with the metal materials and has a melting point higher than a melting point of the metal materials and a filler in which either an integer multiple or 1/integer multiple of a length (a') of a crystal edge of a unit crystal lattice is within ±15% a length (a) of a crystal edge of a unit crystal lattice of the metal materials; and a second step of further performing a fusion processing in the joining portion, wherein the filler supplied in the first step is dispersed during the fusion processing.

4. The method for processing metal materials according to claim 1, wherein, in the first step, the rotary tool is moved, while being rotated, along a longitudinal direction of the joining portion and the two metal materials are joined.

5. The method for processing metal materials according to claim 1, wherein, in the first step, the supply of the filler into the joining portion is performed by placing the filler in the joining portion prior to inserting the rotary tool into the joining portion.

6. The method for processing metal materials according to claim 2, wherein, in the first step, the supply of the filler into the joining portion is performed by ejecting the filler to a location of a moving destination of the rotary tool in the joining portion, as the rotary tool moves.

7. The method for processing metal materials according to claim 6, wherein, in the first step, the joining portion is processed into a groove that is opened in a direction facing the rotary tool before the rotary tool is moved in the joining portion.

8. The method for processing metal materials according to claim 1, wherein, in the first step, the supply of the filler into the joining portion is performed by ejecting the filler into the joining portion from inside the rotary tool.

9. The method for processing metal materials according to claim 1, wherein, in the first step, the supply of the filler into the joining portion is performed by introducing the filler in advance into a material of the rotary tool and rotating the rotary tool, thereby supplying the filler into the joining portion as the rotary tool wears down.

10. A structure formed by processing two or more metal materials by a first step of disposing two metal materials opposite each other in a joining portion, inserting a rod-shaped rotary tool into the joining portion, rotating the rotary tool, and joining the two metal materials, while supplying into the joining portion a filler that does not chemically react with the metal materials and has a melting point higher than a melting point of the metal materials; and a second step of further performing a fusion processing in the joining portion, wherein the filler supplied in the first step is dispersed during the fusion processing.

11. The method for processing metal materials according to any claim 2, wherein, in the first step, the rotary tool is moved, while being rotated, along a longitudinal direction of the joining portion and the two metal materials are joined.

12. The method for processing metal materials according to claim 2, wherein, in the first step, the supply of the filler into the joining portion is performed by placing the filler in the joining portion prior to inserting the rotary tool into the joining portion.

13. The method for processing metal materials according to claim 2, wherein, in the first step, the supply of the filler into the joining portion is performed by ejecting the filler into the joining portion from inside the rotary tool.

14. The method for processing metal materials according to claim 2, wherein, in the first step, the supply of the filler into the joining portion is performed by introducing the filler in advance into a material of the rotary tool and rotating the rotary tool, thereby supplying the filler into the joining portion as the rotary tool wears down.

15. The method for processing metal materials according to claim 3, wherein, in the first step, the rotary tool is moved, while being rotated, along a longitudinal direction of the joining portion and the two metal materials are joined.

16. The method for processing metal materials according to claim 3, wherein, in the first step, the supply of the filler into the joining portion is performed by placing the filler in the joining portion prior to inserting the rotary tool into the joining portion.

17. The method for processing metal materials according to claim 3, wherein, in the first step, the supply of the filler into the joining portion is performed by ejecting the filler to a location of a moving destination of the rotary tool in the joining portion, as the rotary tool moves.

18. The method for processing metal materials according to claim 17, wherein, in the first step, the joining portion is processed into a groove that is opened in a direction facing the rotary tool before the rotary tool is moved in the joining portion.

19. The method for processing metal materials according to claim 3, wherein, in the first step, the supply of the filler into the joining portion is performed by ejecting the filler into the joining portion from inside the rotary tool.

20. The method for processing metal materials according to claim 3, wherein, in the first step, the supply of the filler into the joining portion is performed by introducing the filler in advance into a material of the rotary tool and rotating the rotary tool, thereby supplying the filler into the joining portion as the rotary tool wears down.

21. The method for processing metal materials according to claim 8, wherein the ejected filler is supplied via a channel provided inside the rotary tool.

22. The method for processing metal materials according to claim 9, wherein the rotary tool is composed of porous TiC.

* * * * *